United States Patent
Wang et al.

(10) Patent No.: US 12,461,405 B2
(45) Date of Patent: Nov. 4, 2025

(54) DISPLAY DEVICE

(71) Applicants: HEFEI BOE OPTOELECTRONICS TECHNOLOGY CO., LTD., Hefei (CN); BOE TECHNOLOGY GROUP CO., LTD., Beijing (CN)

(72) Inventors: Yijun Wang, Beijing (CN); Sheng Wang, Beijing (CN); Hui Wang, Beijing (CN); Yuansheng Zang, Beijing (CN); Jun Zhang, Beijing (CN); Ru Zhou, Beijing (CN); Xufei Xu, Beijing (CN); Juncai Ma, Beijing (CN); Qianqian Zhang, Beijing (CN); Bingbing Wu, Beijing (CN); Yuqi Liu, Beijing (CN); Zhaofan Liu, Beijing (CN); Yue Yang, Beijing (CN)

(73) Assignees: HEFEI BOE OPTOELECTRONICS TECHNOLOGY CO., LTD., Hefei (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/280,306

(22) PCT Filed: Nov. 23, 2022

(86) PCT No.: PCT/CN2022/133683
§ 371 (c)(1),
(2) Date: Sep. 5, 2023

(87) PCT Pub. No.: WO2024/108415
PCT Pub. Date: May 30, 2024

(65) Prior Publication Data
US 2025/0053033 A1 Feb. 13, 2025

(51) Int. Cl.
*G02F 1/13* (2006.01)
*G02F 1/1335* (2006.01)
(Continued)

(52) U.S. Cl.
CPC ...... *G02F 1/1323* (2013.01); *G02F 1/133512* (2013.01); *G02F 1/1345* (2013.01); *G02F 1/13629* (2021.01); *G02F 1/1368* (2013.01)

(58) Field of Classification Search
CPC .............. G02F 1/1323; G02F 1/13629; G02F 1/133512; G02F 1/1345; G02F 1/1368
See application file for complete search history.

(56) References Cited

U.S. PATENT DOCUMENTS

2017/0146871 A1* 5/2017 Asozu ............... G02F 1/133308
2021/0271132 A1   9/2021 Chiu et al.
(Continued)

FOREIGN PATENT DOCUMENTS

| CN | 204790254 U | 11/2015 |
|----|-------------|---------|
| CN | 107065242 A | 8/2017  |

(Continued)

OTHER PUBLICATIONS

International Search Report in PCT/CN2022/133683 in Chinese dated Aug. 24, 2023.
(Continued)

*Primary Examiner* — Anne M Hines
(74) *Attorney, Agent, or Firm* — Collard & Roe, P.C.

(57) ABSTRACT

A display device is provided, and the display device includes a display panel and a light adjusting portion. The light adjusting portion is stacked with the display panel, the light adjusting portion includes a first substrate, a refractive index variable material layer, an electrode structure, and a second substrate stacked with each other, and the refractive index variable material layer and the electrode structure are between the first substrate and the second substrate. The light adjusting portion further includes a plurality of signal lines, and the electrode structure and the plurality of signal lines are on the first substrate; the electrode structure (Continued)

includes a first electrode structure and a second electrode structure, the first electrode structure includes a plurality of first electrodes insulated from each other, the first substrate includes a plurality of regions, and first electrodes in different regions are configured to be electrically connected to different signal lines.

19 Claims, 9 Drawing Sheets

(51) Int. Cl.
  *G02F 1/1345* (2006.01)
  *G02F 1/1362* (2006.01)
  *G02F 1/1368* (2006.01)

(56) References Cited

U.S. PATENT DOCUMENTS

2021/0366947 A1  11/2021  Li et al.
2022/0308411 A1   9/2022  Huang et al.
2023/0341734 A1  10/2023  Yang et al.

FOREIGN PATENT DOCUMENTS

| CN | 207396936 U | 5/2018 |
| CN | 110780500 A | 2/2020 |
| CN | 210514885 A | 5/2020 |
| CN | 213987120 U | 8/2021 |
| CN | 113885244 A | 1/2022 |
| CN | 215813616 U | 2/2022 |
| CN | 114384729 A | 4/2022 |
| CN | 114578590 A | 6/2022 |
| CN | 114624906 A | 6/2022 |
| CN | 114660841 A | 6/2022 |
| CN | 114675441 A | 6/2022 |
| CN | 217112940 U | 8/2022 |
| KR | 20080057392 A | 6/2008 |

OTHER PUBLICATIONS

Written Opinion of the International Searching Authority in PCT/CN2022/133683 in Chinese dated Aug. 24, 2023.

* cited by examiner

DISPLAY DEVICE

CROSS REFERENCE TO RELATED APPLICATIONS

This application is the National Stage of PCT/CN2022/133683 filed on Nov. 23, 2022, the disclosure of which is incorporated by reference.

TECHNICAL FIELD

Embodiments of the present disclosure relate to a display device.

BACKGROUND

At present, there are more and more types of display devices with display screens, such as desktop computers, notebook computers, mobile phones, e-readers, etc., and such display devices are widely used in people's work and life. The problem of "information leakage" (such as business secrets, bank ATMs, and passwords for payment accounts at mobile terminals) caused by "visual intrusion" when the above-mentioned display devices are used in public places is gradually being taken into account by people, and thus the demand for screen privacy increases accordingly.

SUMMARY

The present disclosure provides a display device, the display device comprises a display panel and a light adjusting portion, the light adjusting portion is stacked with the display panel, the light adjusting portion comprises a first substrate, a refractive index variable material layer, an electrode structure, and a second substrate stacked with each other, and the refractive index variable material layer and the electrode structure are between the first substrate and the second substrate. The light adjusting portion further comprises a plurality of signal lines, and the electrode structure and the plurality of signal lines are on the first substrate; and the electrode structure comprises a first electrode structure and a second electrode structure, the first electrode structure comprises a plurality of first electrodes insulated from each other, the first substrate comprises a plurality of regions, and first electrodes in different regions are configured to be electrically connected to different signal lines to achieve partition control of the light adjusting portion.

For example, according to the embodiments of the present disclosure, the display panel comprises a plurality of sub-pixels, a ratio of a total number of the plurality of sub-pixels to a total number of the plurality of regions is N, and N is not greater than 10.

For example, according to the embodiments of the present disclosure, the light adjusting portion further comprises a plurality of switch structures on the first substrate, each of the plurality of regions is provided with at least one switch structure, the plurality of signal lines comprise a plurality of first signal lines arranged along a first direction, a first electrode of each of the plurality of switch structures is electrically connected to a corresponding first signal line, and a second electrode of each of the plurality of switch structures is electrically connected to a corresponding first electrode.

For example, according to the embodiments of the present disclosure, the plurality of signal lines further comprise a plurality of second signal lines arranged along a second direction, the switch structure comprises a switch transistor, a gate electrode of the switch transistor is electrically connected to a corresponding second signal line, the first direction intersects with the second direction, and the plurality of first signal lines and the plurality of second signal lines are intersected to form the plurality of regions.

For example, according to the embodiments of the present disclosure, at least one second signal line of the plurality of second signal lines comprises a bent signal line.

For example, according to the embodiments of the present disclosure, at least one first electrode of the plurality of first electrodes comprises a plurality of sub-electrodes electrically connected to each other, an included angle between an extension direction of at least one sub-electrode and an extension direction of at least one first signal line is not greater than 10 degrees, and the plurality of sub-electrodes are arranged along the first direction.

For example, according to the embodiments of the present disclosure, the second electrode structure comprises a connection electrode provided crosswise and a plurality of second electrodes connected to the connection electrode, and an included angle between an extension direction of at least one second electrode and an extension direction of at least one first signal line is not greater than 15 degrees; and in at least one region, the first electrode comprises a plurality of sub-electrodes, an extension direction of each sub-electrode is same as an extension direction of each second electrode, and the plurality of sub-electrodes and the plurality of second electrodes are arranged alternately along the first direction.

For example, according to the embodiments of the present disclosure, the connection electrode comprises a plurality of first connection electrodes extending along an extension direction of the plurality of first signal lines and a plurality of second connection electrodes extending along an extension direction of the plurality of second signal lines, the plurality of first connection electrodes and the plurality of first signal lines are provided alternately, and the plurality of second connection electrodes and the plurality of second signal lines are provided alternately.

For example, according to the embodiments of the present disclosure, the display panel further comprises a plurality of data lines arranged along the first direction and a plurality of gate lines arranged along the second direction, an extension direction of the data line is different from an extension direction of at least partial position of the first signal line, and an extension direction of the gate line is different from an extension direction of at least partial position of the second signal line.

For example, according to the embodiments of the present disclosure, the display panel further comprises a plurality of data lines arranged along the first direction and a plurality of gate lines arranged along the second direction, and an orthographic projection of at least one data line on the first substrate overlaps with an orthographic projection of the first signal line on the first substrate.

For example, according to the embodiments of the present disclosure, the display panel further comprises a plurality of data lines arranged along the first direction and a plurality of gate lines arranged along the second direction, and an extension direction of the data line is same as an extension direction of the sub-electrode.

For example, according to the embodiments of the present disclosure, each sub-pixel comprises a thin film transistor, and a channel width-to-length ratio of the thin film transistor is not greater than a channel width-to-length ratio of the switch transistor.

For example, according to the embodiments of the present disclosure, the light adjusting portion further comprises a black matrix, and an orthographic projection of the black matrix on the first substrate covers at least part of orthographic projections of the plurality of first signal lines and the plurality of second signal lines on the first substrate.

For example, according to the embodiments of the present disclosure, the first electrode structure and the second electrode structure are provided in a same layer; or the first electrode structure is between the second electrode structure and the first substrate.

For example, according to the embodiments of the present disclosure, portions of the plurality of signal lines are electrically connected to the plurality of first electrodes in one-to-one correspondence.

For example, according to the embodiments of the present disclosure, the first electrode structure and the second electrode structure are in different layers, and at least one of the plurality of signal lines is electrically connected to the second electrode structure.

For example, according to the embodiments of the present disclosure, the first electrode comprises a plurality of sub-electrodes arranged along a first direction, the second electrode structure comprises a plurality of second electrodes arranged along the first direction, and the plurality of sub-electrodes and the plurality of second electrodes are provided alternately along the first direction.

For example, according to the embodiments of the present disclosure, the first electrode further comprises a first sub-connection portion electrically connected to the plurality of sub-electrodes, and the second electrode structure further comprises a second sub-connection portion electrically connected to the plurality of second electrodes.

For example, according to the embodiments of the present disclosure, a shape of at least one signal line at a partial position overlapping with the first electrode in a direction perpendicular to the first substrate is straight or bent.

For example, according to the embodiments of the present disclosure, the display device further comprises a first polarization structure, on a side of the display panel away from the light adjusting portion; a second polarization structure, between the display panel and the light adjusting portion; and a third polarization structure, on a side of the light adjusting portion away from the display panel. A polarization direction of the first polarization structure intersects with a polarization direction of the second polarization structure, and a polarization direction of the third polarization structure is same as the polarization direction of the second polarization structure.

For example, according to the embodiments of the present disclosure, the display device further comprises an anti-peeping film, on a light incident side of the light adjusting portion.

For example, according to the embodiments of the present disclosure, the display device further comprises a backlight structure, stacked with the light adjusting portion and the display panel. The light adjusting portion is between the backlight structure and the display panel, or the display panel is between the light adjusting portion and the backlight structure.

For example, according to the embodiments of the present disclosure, a line width of the sub-electrode is 1-15 microns, a line width of the second electrode is 1-15 microns, and a distance between a sub-electrode and a second electrode provided adjacent to each other is 2-15 microns.

For example, according to the embodiments of the present disclosure, the refractive index variable material layer comprises a liquid crystal layer, and a thickness of the liquid crystal layer is 2-50 microns.

For example, according to the embodiments of the present disclosure, an operating voltage of the light adjusting portion is 3-25V.

BRIEF DESCRIPTION OF DRAWINGS

In order to clearly illustrate the technical solution of the embodiments of the present disclosure, the drawings of the embodiments will be briefly described. It is obvious that the described drawings in the following are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprise," "comprising." "include," "including." etc., are intended to specify that the elements or the objects stated before these terms encompass the elements or the objects and equivalents thereof listed after these terms, but do not preclude the other elements or objects.

A display device with a privacy function may include a non-switchable privacy display device. The display device achieves the privacy function by sticking an anti-peeping film on a display screen. This display device is applied to a single scene, such as only applying to a privacy state displaying demand, and the thickness of this display device is relatively thick. The anti-peeping film may reduce the brightness of the displayed image and affect the visual effect. This kind of display device has low cost and is mainly applied to mobile phones with a sticking film to prevent peeping.

The display device with the privacy function may also include a switchable privacy display device, and the display device may achieve the regulation of the brightness of the side viewing angle of the display surface of the display panel by adopting a combination of a collimated backlight, a privacy panel, and a display panel, and by applying different voltages to the privacy panel.

Figure 1:
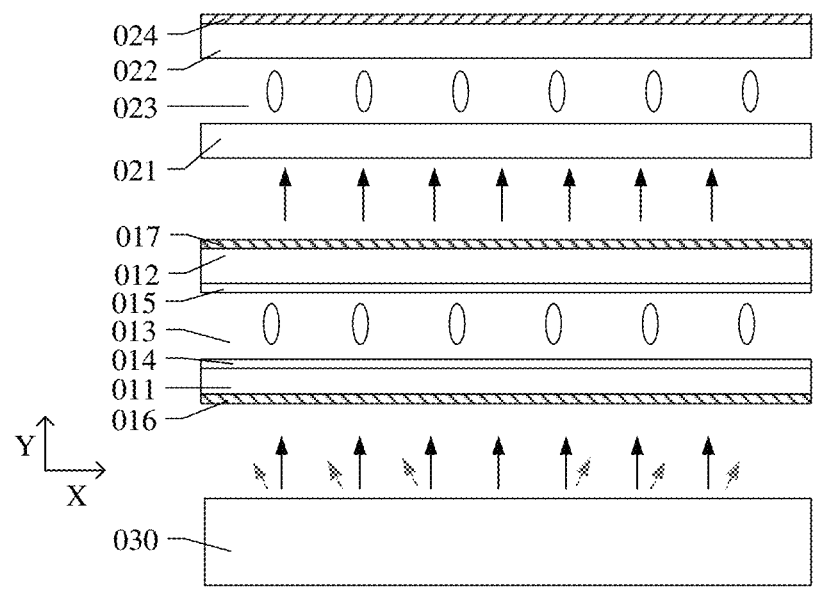
FIG. 1 and FIG. 2 are schematic diagrams of a partial cross-sectional structure of a display device.
Figure 2:
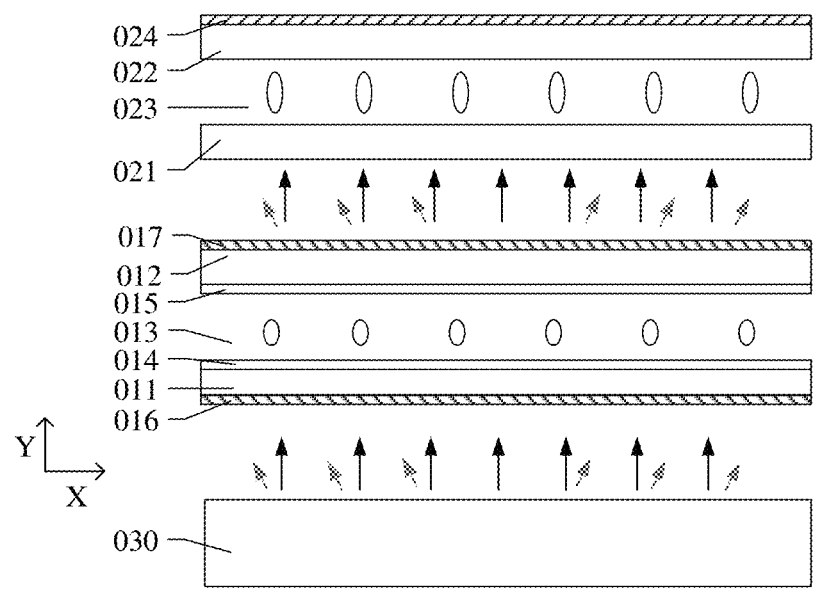

FIG. 1 and FIG. 2 are schematic diagrams of a partial cross-sectional structure of a display device. FIG. 1 illustrates the operating principle when the display device is in a privacy state, and FIG. 2 illustrates the operating principle when the display device is in a sharing state.

In the present disclosure (including various embodiments described later), the "privacy state" means that the light intensity of the image light emitted from the display device is concentrated and distributed within a viewing angle within 45 degrees from the normal line of the display surface of the display device, and the image displayed on the display surface is not clearly visible when the included angle between the viewer's eyes and the normal line is greater than 45 degrees. Thus, the "privacy state" can refer to a state of preventing others from peeping information, which can better protect the privacy of the user and prevent the leakage of information.

In the present disclosure (including various embodiments described later), the "sharing state" is a state that has effect of dispersed light relative to the "privacy state", for example, the light intensity of the image light emitted from the display device is not concentrated in the viewing angle within 45 degrees from the normal line of the display surface, and when the included angle between the viewer's eyes and the normal line is greater than 45 degrees, the viewer can still see the image displayed on the display surface clearly. Thus, the "sharing state" can refer to a state in which information is shared with others, and it is possible to achieve simultaneous viewing of images displayed by the display device by multiple people.

As illustrated in FIG. 1 and FIG. 2, the display device includes a display panel, a privacy panel, and a backlight 030 stacked with each other, and the privacy panel is between the display panel and the backlight 030. Optionally, the privacy panel may also be provided on a side of the display panel away from the backlight, that is, the display panel is between the privacy panel and the backlight, which is not limited here. For example, the display panel and the privacy panel are stacked in the Y direction. The privacy panel may be a light adjusting liquid crystal cell, including a first light-transmitting substrate 011 and a second light-transmitting substrate 012 stacked with each other, and a liquid crystal layer 013 is between the first light-transmitting substrate 011 and the second light-transmitting substrate 012. A first full-surface electrode layer 014 is between the first light-transmitting substrate 011 and the liquid crystal layer 013, a second full-surface electrode layer 015 is between the second light-transmitting substrate 012 and the liquid crystal layer 013, and the first full-surface electrode layer 014 and the second full-surface electrode layer 015 drive the liquid crystals in the liquid crystal layer 013 to rotate when a voltage is input. A polarizing layer 016 is provided on a side of the first light-transmitting substrate 011 away from the liquid crystal layer 013, and a polarizing layer 017 is provided on a side of the second light-transmitting substrate 012 away from the liquid crystal layer 013, and the polarization direction of the polarizing layer 016 is the same as the polarization direction of the polarizing layer 017. An alignment film is provided between the first full-surface electrode layer 014 and the liquid crystal layer 013 and between the second full-surface electrode layer 015 and the liquid crystal layer 013, which are not illustrated in the figures.

As illustrated in FIG. 1 and FIG. 2, the display panel includes a first substrate 021 and a second substrate 022 stacked with each other, and a liquid crystal layer 023 is provided between the first substrate 021 and the second substrate 022. An electrode layer provided between the first substrate 021 and the liquid crystal layer 023 and an electrode layer provided between the second substrate 022 and the liquid crystal layer 023 drive the liquid crystals in the liquid crystal layer 023 to rotate when a voltage is input. The display panel further includes a polarizing layer 024 on a side of the second substrate 022 away from the first substrate 021, the polarization direction of the polarizing layer 017 intersects with the polarization direction of the polarizing layer 024, and the polarization direction of the polarized light emitted through the polarizing layer 017 intersects with the polarization direction of the polarized light emitted through the polarizing layer 024. For example, the display panel may also be provided between the privacy panel and the backlight, which is not limited here. For example, the two electrode layers of the display panel are provided on the same substrate of the display panel, for example, both are provided on a side of the second substrate or the first substrate facing the liquid crystal layer 023.

As illustrated in FIG. 1 and FIG. 2, the display device controls the deflection state of the liquid crystals in the liquid crystal layer 013 by applying different voltages to the privacy panel, such as the electrode layers 014 and 015 of the light adjusting liquid crystal cell, so as to control the viewing angle. For example, the light emitted by the backlight is micro-collimated light. As illustrated in FIG. 1, when an appropriate voltage is applied to the light adjusting liquid crystal cell, the liquid crystals in the liquid crystal layer 013 rotates, and in this case, the light in the backlight through the polarizing layer 016 enters the liquid crystal cell, and due to the deflection of the liquid crystals, the polarization state of the light at the front viewing angle remains unchanged and is emitted from the polarizing layer 017, the light at the side viewing angle becomes non-linearly polarized light and then is filtered out by the polarizing layer 017, and the light adjusting liquid crystal cell absorbs the light at the side viewing angle emitted from the backlight and achieves the purpose of narrowing the viewing angle to achieve a very good privacy effect.

As illustrated in FIG. 2, when no voltage is applied to the light adjusting liquid crystal cell, the liquid crystals in the liquid crystal layer 013 do not rotate, and the light emitted from the backlight and passing through the light adjusting liquid crystal cell basically does not deflect. The light passes through the polarizing layer 016 and the polarizing layer 017 which are of the same polarization direction, and the light adjusting liquid crystal cell has no absorption effect on the light at the side viewing angle emitted from the backlight, so as to achieve the sharing state of the display device.

Figure 3:
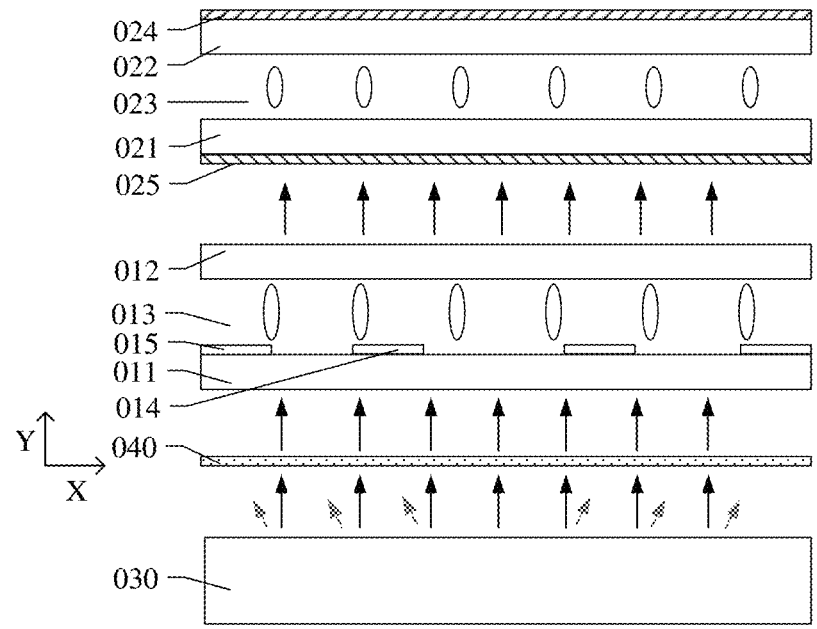
FIG. 3 and FIG. 4 are schematic diagrams of a partial cross-sectional structure of another display device.
Figure 4:
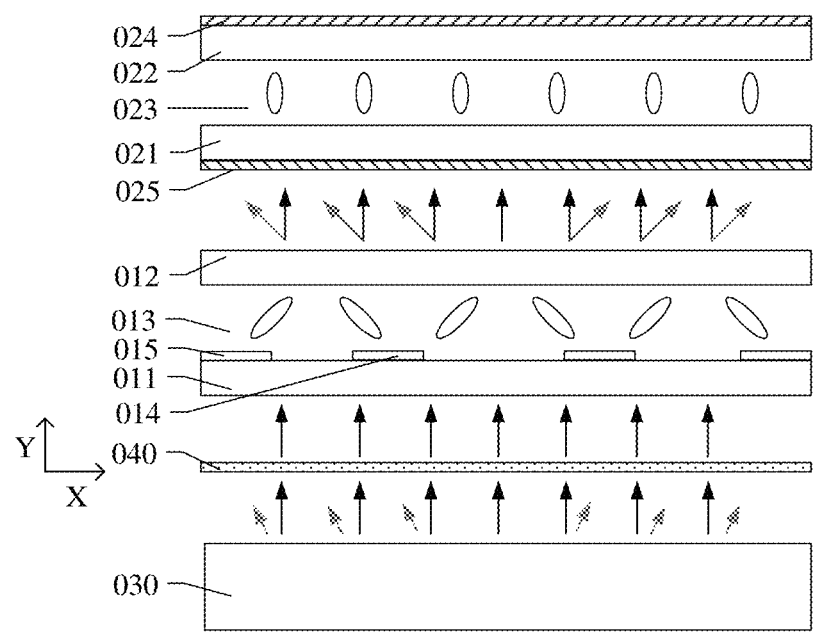

FIG. 3 and FIG. 4 are schematic diagrams of a partial cross-sectional structure of another display device. FIG. 3 illustrates the operating principle when the display device is in the privacy state, and FIG. 4 illustrates the operating principle when the display device is in the sharing state.

As illustrated in FIG. 3 and FIG. 4, the display device includes a display panel, a privacy panel, and a backlight 030 stacked with each other, and the privacy panel is between the display panel and the backlight 030. Optionally, the privacy panel may also be provided on a side of the display panel away from the backlight, that is, the display panel is between the privacy panel and the backlight, which is not limited here. For example, the display panel and the privacy panel are stacked in the Y direction. The privacy panel may be a light adjusting liquid crystal cell, including a first light-transmitting substrate 011 and a second light-transmitting substrate 012 stacked with each other, and a liquid crystal layer 013 is between the first light-transmitting substrate 011 and the second light-transmitting substrate 012. First electrodes 014 and second electrodes 015 are provided alternately along the X direction between the first transparent substrate 011 and the liquid crystal layer 013, and the first electrodes 014 and the second electrodes 015 drive the liquid crystals in the liquid crystal layer 013 to rotate when a voltage is input. An alignment film is provided between the first light-transmitting substrate 011 and the liquid crystal layer 013 and between the second light-transmitting substrate 012 and the liquid crystal layer 013, which are not illustrated in the figures.

As illustrated in FIG. 3 and FIG. 4, an anti-peeping film 040 is provided between the backlight 030 and the light adjusting liquid crystal cell, and the anti-peeping film 040 absorbs the light at the side viewing angle of the micro-collimated light emitted by the backlight 030, so that the light from the anti-peeping film to the light adjusting liquid crystal cell basically has no light at the side viewing angle. For example, the anti-peeping film 040 may be a structure in which a black material is arranged in a louver structure.

As illustrated in FIG. 3 and FIG. 4, the display panel includes a first substrate 021 and a second substrate 022 stacked with each other, and a liquid crystal layer 023 is provided between the first substrate 021 and the second substrate 022. An electrode layer provided between the first substrate 021 and the liquid crystal layer 023 and an electrode layer provided between the second substrate 022 and the liquid crystal layer 023 drive the liquid crystals in the liquid crystal layer 023 to rotate when a voltage is input. The display panel further includes a polarizing layer 024 on a side of the second substrate 022 away from the first substrate 021 and a polarizing layer 025 on a side of the first substrate 021 away from the second substrate 022, the polarization direction of the polarizing layer 025 intersects with the polarization direction of the polarizing layer 024, and the polarization direction of the polarized light emitted through the polarizing layer 025 intersects with the polarization direction of the polarized light emitted through the polarizing layer 024.

As illustrated in FIG. 3, when the electrode layer of the light adjusting liquid crystal cell does not drive the liquid crystals to deflect, the propagation direction of the light that has basically no side viewing angle emitted from the anti-peeping film to the light adjusting liquid crystal cell does not change, and the light emitted from the light adjusting liquid crystal cell and emitted to the display panel has basically no side viewing angle, thereby achieving the privacy effect. As illustrated in FIG. 4, the display device controls the deflection state of the liquid crystals in the liquid crystal layer by applying a voltage to the first electrode and the second electrode, such as a positive electrode and a negative electrode, in the light adjusting liquid crystal cell to achieve the control of the viewing angle. When a voltage is applied to the electrode layer of the light adjusting liquid crystal cell, the light adjusting liquid crystal cell can diverge the light that has basically no side viewing angle emitted from the anti-peeping film to the light adjusting liquid crystal cell, for example, the light adjusting liquid crystal cell can diverge the light at the front viewing angle or close to the front viewing angle to a large viewing angle direction, the greater the applied voltage, the better the divergence effect of the light, so that the light emitted from the light adjusting liquid crystal cell and emitted to the display panel is divergent light, thereby achieving a good sharing state effect. Referring to FIG. 4, the first electrode and the second electrode are provided in the same layer in this case. Optionally, the first electrode and the second electrode are provided in different layers, and an insulation layer is provided between the first electrode and the second electrode, which is not limited here.

During the research, the inventor(s) of the present application found that: in the case where the display device illustrated in FIG. 1 and the display device illustrated in FIG. 3 achieve the same privacy effect, the sharing state effect of the display device illustrated in FIG. 3 is better, and the display devices illustrated in FIG. 1 and FIG. 3 both adopt the full-surface privacy state-sharing state switching technology, which is incapable of achieving privacy state-sharing state switching independently in a specific region of the display device.

The present disclosure provides a display device, and the display device includes a display panel and a light adjusting portion. The light adjusting portion is stacked with the display panel, the light adjusting portion includes a first substrate, a refractive index variable material layer, an electrode structure, and a second substrate stacked with each other, and the refractive index variable material layer and the electrode structure are between the first substrate and the second substrate. The light adjusting portion further includes a plurality of signal lines, and the electrode structure and the plurality of signal lines are on the first substrate; and the electrode structure includes a first electrode structure and a second electrode structure, the first electrode structure includes a plurality of first electrodes insulated from each other, the first substrate includes a plurality of regions, and first electrodes in different regions are configured to be electrically connected to different signal lines to achieve partition control of the light adjusting portion. The display device provided by the present disclosure is applied to the privacy-sharing switching technology, in which a plurality of signal lines are provided in the light adjusting portion, and different first electrodes of the first electrode structure in different regions are electrically connected to different signal lines to achieve the privacy state-sharing state switching independently in specific regions of the display device, which is beneficial to improving the user's experience of using the display device.

The display device provided by the present disclosure will be described below with reference to the drawings.

Figure 5:
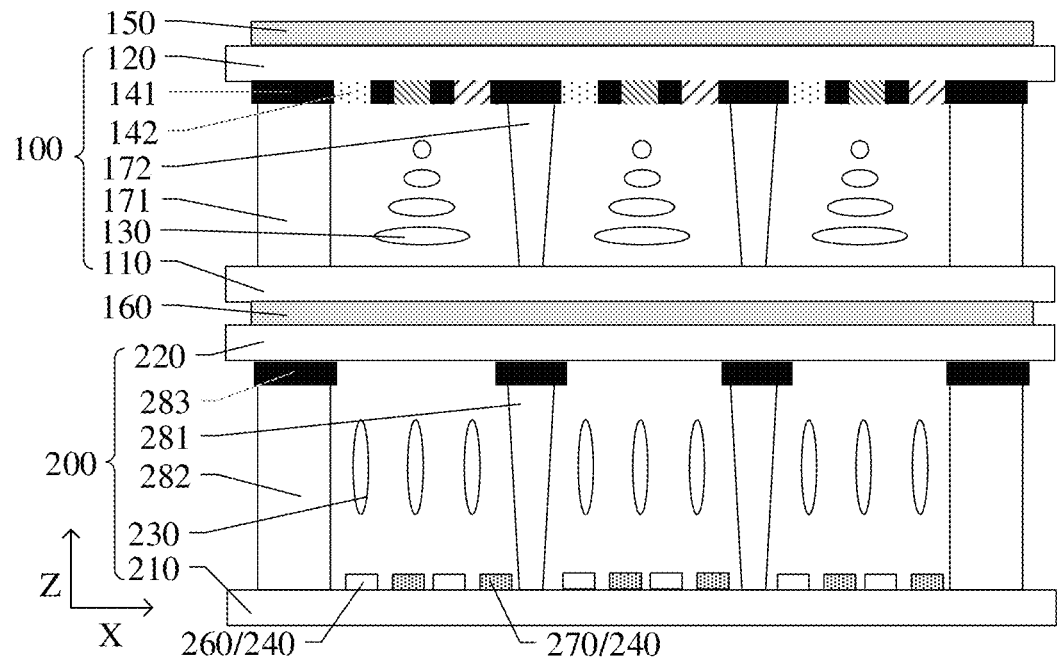
FIG. 5 is a schematic diagram of a partial structure of a display device provided by the embodiments of the present disclosure.
Figure 6:
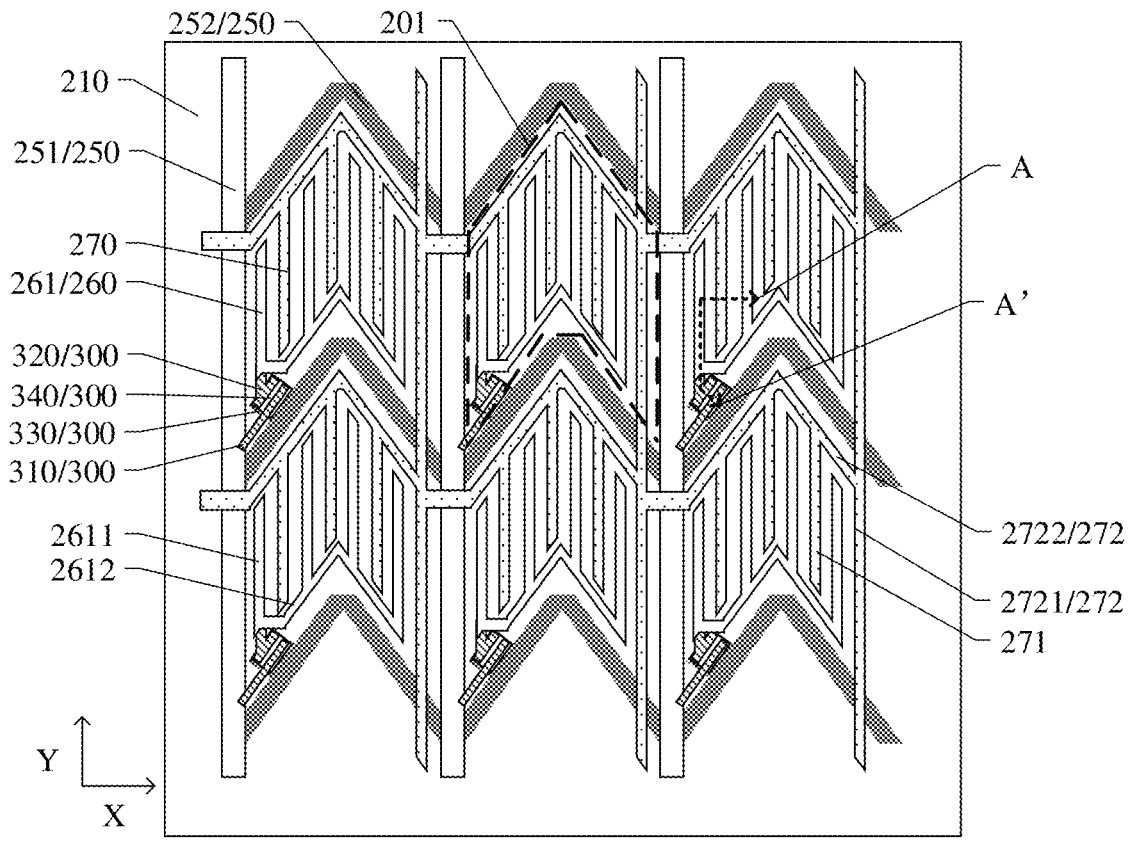
FIG. 6 is a schematic partial plan diagram of the light adjusting portion illustrated in FIG. 5.

FIG. 5 is a schematic diagram of a partial structure of a display device provided by the embodiments of the present disclosure, and FIG. 6 is a schematic partial plan diagram of the light adjusting portion illustrated in FIG. 5. As illustrated in FIG. 5 and FIG. 6, the display device includes a display panel 100 and a light adjusting portion 200 stacked with each other. It should be noted that, in this case, the positional relationship between the display panel and the light adjusting portion can be interchanged without any specific limitation. For example, the display panel 100 and the light adjusting portion 200 are stacked along a Y direction, and the Y direction is a direction perpendicular to the display surface of the display panel 100.

As illustrated in FIG. 5 and FIG. 6, the light adjusting portion 200 includes a first substrate 210, a refractive index variable material layer 230, an electrode structure 240 and a second substrate 220, and the refractive index variable material layer 230 and the electrode structure 240 are both between the first substrate 210 and the second substrate 220. In the embodiments of the present disclosure, the first substrate and the second substrate can be interchanged.

As illustrated in FIG. 5 and FIG. 6, the light adjusting portion 200 further includes a plurality of signal lines 250, and the electrode structure 240 and the plurality of signal lines 250 are all on the first substrate 210. The embodiments of the present disclosure are not limited thereto, and the plurality of signal lines and the electrode structure may be all on the second substrate, that is, the plurality of signal lines and the electrode structure are all on the same substrate.

As illustrated in FIG. 5 and FIG. 6, the electrode structure 240 includes a first electrode structure 260 and a second electrode structure 270, the first electrode structure 260 includes a plurality of first electrodes 261 insulated from each other, the first substrate 210 includes a plurality of regions 201, and the first electrodes 261 in different regions 201 are configured to be electrically connected to different signal lines 250 to achieve partition control of the light adjusting portion 200. For example, the plurality of first electrodes 261 are provided in the same layer. For example, the first electrodes 261 in different regions 201 are insulated from each other.

The display device provided by the present disclosure is applied to the privacy-sharing switching technology, and by providing a plurality of signal lines in the light adjusting portion and electrically connecting different first electrodes in different regions of the first electrode structure to different signal lines, it is possible to achieve that the light incident into the light adjusting portion can be independently controlled in different regions of the light adjusting portion, which in turn achieves that the privacy state-sharing state switching is carried out independently for any specified region in the display device, and improves the user's experience of using the display device.

For example, different display states can be set for different display regions corresponding to the main driver's position and the co-driver's position in the vehicle display, and the different display states include the privacy state and the sharing state. For example, the display device provided by the present disclosure can be applied in scenarios such as aviation entertainment display, business office, such as business secrets, and ATM display, such as a region for financial privacy or payment password.

For example, both the first substrate 210 and the second substrate 220 are light-transmitting substrates formed of light-transmitting materials. For example, the materials of the first substrate 210 and the second substrate 220 may be glass, organic polymer or other transparent materials.

In some examples, as illustrated in FIG. 5, the refractive index variable material layer 230 includes a liquid crystal layer, and the thickness of the liquid crystal layer is 2-50 microns. For example, the thickness of the liquid crystal layer is 5-40 microns. For example, the thickness of the liquid crystal layer is 10-45 microns. For example, the thickness of the liquid crystal layer is 15-30 microns. For example, the thickness of the liquid crystal layer is 20-35 microns. For example, the thickness of the liquid crystal layer is 25-37 microns.

For example, as illustrated in FIG. 5, a support post (PS) 281 and a ring of sealant 282 surrounding the refractive index variable material layer 230 are further provided between the first substrate 210 and the second substrate 220. For example, an alignment film may be provided on a side of the first substrate 210 facing the liquid crystal layer and a side of the second substrate 220 facing the liquid crystal layer to align the liquid crystals in the liquid crystal layer. For example, an initial alignment direction of the liquid crystals may be a direction perpendicular to the first substrate 210. For example, the alignment angle may be 85-90 degrees to anchor the positive liquid crystals in the liquid crystal layer in an initial state in the direction perpendicular to the first substrate.

For example, the liquid crystals in the liquid crystal layer may be positive liquid crystals. The liquid crystals in the liquid crystal layer included in the refractive index variable material layer 230 have a birefringence characteristic, for example, the refractive indices of the liquid crystals in different directions are a refractive index ne and a refractive index no, respectively, and the difference Δn between the refractive index ne and the refractive index no may be 0.08-0.3, such as 0.1-0.2, such as 0.22-0.25, such as 0.15-0.28.

For example, in the initial state, no driving signal is applied to the liquid crystal layer (i.e., there is no voltage difference between the first electrode structure 260 and the second electrode structure 270), the liquid crystal layer does not change the propagation direction of the light incident into the light adjusting portion 200, and when the light incident into the light adjusting portion 200 has basically no side viewing angle, the light emitted from the light adjusting portion 200 is still basically having no side viewing angle, and in this case, the display device is in the privacy state.

For example, when there is a voltage difference between the first electrode structure 260 and the second electrode structure 270 to apply a driving signal to the liquid crystal layer, the liquid crystals will deflect, and the liquid crystal layer will change the propagation direction of part of the light entering the liquid crystal layer. For example, when the light incident into the light adjusting portion 200 has basically no side viewing angle, the deflected liquid crystals cause some of the light to be dispersed, such as dispersing light of the front viewing angle or close to the front viewing angle into a large viewing angle direction, and in this case, the display device is in the sharing state.

For example, the electrode structure 240 may be a light-transmitting electrode structure, for example, the material of the electrode structure 240 may be a transparent conductive material such as indium tin oxide (ITO).

For example, different voltages are applied to the first electrode structure 260 and the second electrode structure 270 to form a voltage difference during the operating process of the light adjusting portion 200. For example, the first electrode structure 260 and the second electrode structure 270 may be applied with a positive voltage and a negative voltage, respectively.

In some examples, as illustrated in FIG. 5 and FIG. 6, the light adjusting portion 200 further includes a plurality of switch structures 300 on the first substrate 210, each region 201 is provided with at least one switch structure 300, the plurality of signal lines 250 include a plurality of first signal lines 251 arranged along a first direction, a first electrode 310 of the switch structure 300 is electrically connected to the first signal line 251, and a second electrode 320 of the switch structure 300 is electrically connected to the first electrode 261. The first electrode and the second electrode of the above-mentioned switch structure can be interchanged.

In some examples, as illustrated in FIG. 5 and FIG. 6, the switch structure 300 includes a switch transistor. For example, the switch transistor may be a thin film transistor. For example, the thin film transistor includes a first electrode 310 electrically connected to the first signal line 251, a second electrode 320 electrically connected to the first electrode 261 of the first electrode structure 260, a gate electrode 330 and an active layer 340. For example, one of the first electrode 310 and the second electrode 320 may be a source electrode of the thin film transistor, and the other may be a drain electrode of the thin film transistor, and the active layer 340 includes a source region in contact with the source electrode and a drain region in contact with the drain electrode. For example, the active layer 340 may include at least one of low-temperature polysilicon layer, amorphous silicon, and oxide semiconductor material, which is not limited herein, and the above-mentioned source region and drain region may be conducted by doping or the like to achieve electrical connection to the source electrode and the drain electrode, respectively. The source region and the drain region of the thin film transistor adopted in the embodiments of the present disclosure may be identical in structure, so there may be no difference in structure between the source region and the drain region, and thus the source region and the drain region can be interchanged as required.

For example, the active layer 340 may be made of amorphous silicon (a-Si), polysilicon, an oxide semiconductor material, or the like. For example, the material of the active layer 340 may be low-temperature polysilicon (LTPS), indium gallium zinc oxide (IGZO), indium zinc oxide (IZO), amorphous silicon or other materials; in addition, the transistor may be a top-gate structure (that is, the gate electrode is provided on a side of the semiconductor layer away from the base substrate), or a bottom-gate structure (that is, the gate electrode is provided on a side of the semiconductor layer close to the base substrate), which is not limited herein.

It should be noted that the above-mentioned source region and drain region may be regions doped with n-type impurities or p-type impurities.

In some examples, as illustrated in FIG. 5 and FIG. 6, the plurality of signal lines 250 further include a plurality of second signal lines 252 arranged along a second direction, the gate electrode 330 of the switch transistor 300 is electrically connected to the second signal line 252, the first direction intersects with the second direction, and the plurality of first signal lines 251 and the plurality of second signal lines 252 are intersected to form a plurality of regions 201. For example, the plurality of regions 201 on the first substrate 210 may be regions 201 defined by intersections of the first signal lines 251 and the second signal lines 252, and the first electrode structure 260 is in the region 201. For example, the switch structure 300 is in the region 201. For example, each region 201 is an independently light adjusting region.

For example, FIG. 6 schematically illustrates that the first direction is the X direction, and the second direction is the Y direction, but the embodiments are not limited thereto, the first direction and the second direction can be interchanged. For example, the included angle between the first direction and the second direction may be 80-100 degrees. For example, the first direction is perpendicular to the second direction.

For example, as illustrated in FIG. 5 and FIG. 6, the second signal line 252 is electrically connected to the gate electrode 330 of the thin film transistor 300 to control the turning-on or turning-off of the thin film transistor, and the first signal line 251 is electrically connected to the first electrode 310 of the thin film transistor 300, so that the signal transmitted in the first signal line 251 is input into the first electrode structure 260 through the thin film transistor 300. For example, the gate electrode 330 of the thin film transistor 300 may be formed as an integral structure with the second signal line 252.

For example, as illustrated in FIG. 5 and FIG. 6, the second electrode structure 270 may be an electrode structure shared by the plurality of regions 201, and the different first electrodes 261 included in the first electrode structure 260 may be electrode structures independently provided in different regions 201.

For example, as illustrated in FIG. 5 and FIG. 6, the second electrode structure 270 is input with a first voltage, and the first signal line 251 and the second signal line 252 corresponding to a first partial region in the plurality of regions 201 are both input with a signal, so that the thin film transistor 300 in the first partial region is turned on. The voltage input by the first signal line 251 to the first electrode structure 260 through the thin film transistor 300 is a second voltage, the second voltage is different from the first voltage, there is a voltage difference between the first electrode structure 260 and the second electrode structure 270 in the first partial region, the liquid crystals corresponding to the first partial region are deflected, and the light passing through the first partial region is refracted by the liquid crystals, so that the first partial region is in the sharing state. However, the first signal line 251 and the second signal line 252 corresponding to a second partial region are both input with a signal, so that the thin film transistor 300 in the second partial region is turned on, the first electrode structure 260 is input with the same voltage as the first voltage, there is no voltage difference between the first electrode structure 260 and the second electrode structure 270, the liquid crystals corresponding to the second partial region are not deflected, and the propagation direction of light passing through the second partial region does not change, so that the second partial region is in the privacy state.

Of course, the embodiments of the present disclosure are not limited thereto, for example, the second electrode structure may be input with a 0V voltage. The sharing state or privacy state selection setting for a particular position is achieved by controlling the thin film transistor in the first partial region to be turned on to transmit the signal on the first signal line to the first electrode structure so that there is a voltage difference between the first electrode structure and the second electrode structure in the first partial region, and by controlling the thin film transistor in the second partial region to be turned on and transmit the 0V voltage signal to the first electrode structure so that there is no voltage difference between the first electrode structure and the second electrode structure.

In some examples, as illustrated in FIG. 5 and FIG. 6, the operating voltage of the light adjusting portion 200 is 3-25V. The above-mentioned operating voltage refers to the voltage difference between the first electrode structure and the second electrode structure. For example, the operating voltage of the light adjusting portion 200 is 4-24V. For example, the operating voltage of the light adjusting portion 200 is 10-22V. For example, the operating voltage of the light adjusting portion 200 is 5-20V. For example, the operating voltage of the light adjusting portion 200 is 8-15V. For example, the operating voltage of the light adjusting portion 200 is 6~18V. For example, the voltage signal applied to the first electrode structure 260 may be a sinusoidal AC wave, an AC square wave or other voltage waveforms capable of changing the state of the liquid crystals. Referring to FIG. 6, optionally, the first electrode structure 260 and the second electrode structure 270 are provided in the same layer; or the first electrode structure 260 and the second electrode structure 270 are provided in different layers, and an insulation layer is provided between the first electrode structure 260 and the second electrode structure 270; or the plurality of first electrodes 261 included in the first electrode structure 260 are provided in different layers, and the first electrodes provided in different layers are electrically connected to each other through vias in the insulation layer; or the plurality of second electrodes 271 included in the second electrode structure 270 are provided in different layers, and the second electrodes provided in different layers are electrically connected to each other through vias in the insulation layer. The specific electrode film layer structure is not limited here. In addition, the gate lines in the present disclosure are designed to be bent or non-linear. Optionally, the gate lines and the data lines in the present disclosure are all designed to be non-linear, which can reduce or eliminate the problem of moire phenomenon of the privacy display device; optionally, the non-linear arrangements of two adjacent data lines are set in different ways, i.e., in the case where one data line bends towards one side, the corresponding bending direction of the other data line adjacent to the one data line is facing the other side, and the bending directions of two data lines spaced apart by a single data line are identical to each other, so that the problem of moire phenomenon of the privacy display device can be reduced or eliminated.

In the display device provided by the present disclosure, switch transistors are provided in different regions, and the partition control of the light adjusting portion is achieved by adjusting the switching state of the switch transistors and the magnitude of the voltage input to the first electrode structure, so that the light adjusting portion has a partial active privacy function in which a specific region is in the sharing state or the privacy state. The light adjusting portion with the partial active privacy function can be applied to special scenarios such as aviation entertainment display, business office (such as privacy display for business secrets), ATM display (such as privacy display for financial privacy and payment passwords), etc., which greatly improves the user's experience.

Figure 7:
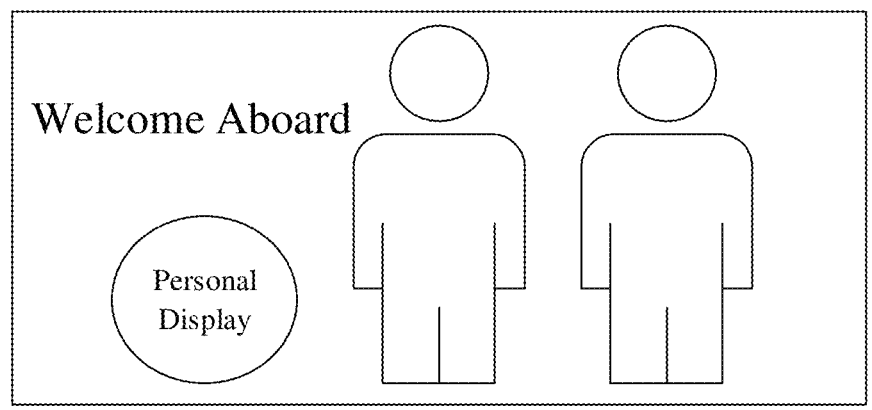
FIG. 7 to FIG. 9 are display images of a display device in different states or viewing angles provided by the embodiments of the present disclosure.
Figure 8:
Figure 9:
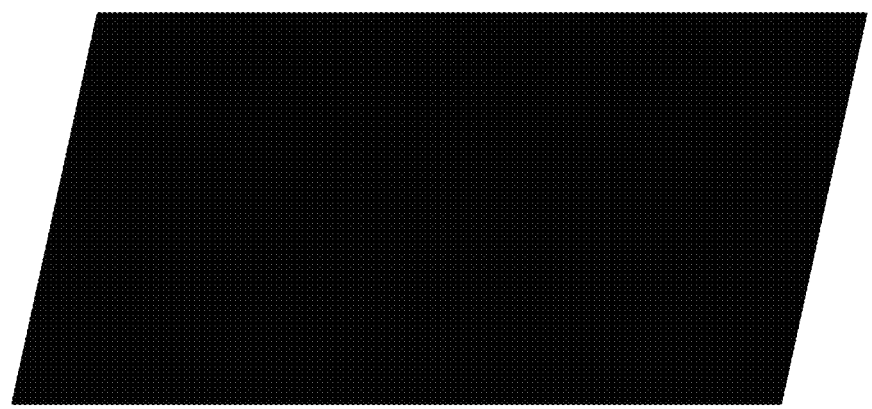

FIG. 7 to FIG. 9 are display images of a display device in different states or viewing angles provided by the embodiments of the present disclosure. As illustrated in FIG. 7, the display image of the display device is in a front viewing angle, and the user can see a welcome boarding interface in the aviation display, which includes a personal display region. As illustrated in FIG. 8, the display device is in a partial sharing state, and only a partial region of the display image can be seen when viewed from a side viewing angle, and other regions are in the privacy state. As illustrated in FIG. 9, the display device is in a full-surface privacy state, and basically nothing can be seen when viewing the display image from a side viewing angle.

For example, as illustrated in FIG. 6, the plurality of regions 201 are arranged in an array along the first direction and the second direction. For example, one switch structure is provided in each region 201, and one first electrode 261 is provided in each region 201.

In some examples, as illustrated in FIG. 6, at least one first electrode 261 includes a plurality of sub-electrodes 2611 electrically connected to each other, the included angle between the extension direction of the sub-electrode 2611 and the extension direction of the first signal line 251 is not greater than 15 degrees, and the plurality of sub-electrodes 2611 are arranged along the first direction. For example, the included angle between the extension direction of the sub-electrode 2611 and the extension direction of the first signal line 251 is not greater than 10 degrees. For example, the included angle between the extension direction of the sub-electrode 2611 and the extension direction of the first signal line 251 is not greater than 5 degrees. For example, the included angle between the extension direction of the sub-electrode 2611 and the extension direction of the first signal line 251 is not greater than 3 degrees. For example, the included angle between the extension direction of the sub-electrode 2611 and the extension direction of the first signal line 251 is not greater than 1 degree. For example, the extension direction of the sub-electrode 2611 is parallel to the extension direction of the first signal line 251. The extension direction of the sub-electrode may be parallel to the extension direction of one side of the display panel to achieve the deflection of the liquid crystals in a specified direction. For example, the extension direction of the first signal line may intersect with the extension direction of the top side of the display panel.

For example, as illustrated in FIG. 6, each first electrode 261 includes a plurality of sub-electrodes 2611 electrically connected to each other. For example, the first electrode 261 further includes a connection portion 2612 electrically connecting the plurality of sub-electrodes 2611. For example, the material of the sub-electrode 2611 is identical to the material of the connection portion 2612. For example, the sub-electrodes 2611 are formed as an integral structure with the connection portion 2612. For example, the sub-electrodes 2611 and the connection portion 2612 may be formed in the same patterning process. For example, the included angle between the extension direction of the connection portion 2612 and the extension direction of the second signal line 252 is not greater than 10 degrees. For example, the included angle between the extension direction of the connection portion 2612 and the extension direction of the second signal line 252 is not greater than 5 degrees. For example, the extension direction of the connection portion 2612 is parallel to the extension direction of the second signal line 252.

For example, as illustrated in FIG. 6, the orthographic projection of the sub-electrode 2611 on the first substrate 210 does not overlap with the orthographic projection of the signal line 250 on the first substrate 210. For example, the orthographic projection of the connection portion 2612 on the first substrate 210 does not overlap with the orthographic projection of the signal line 250 on the first substrate 210.

In some examples, as illustrated in FIG. 6, the line width of the sub-electrode 2611 is 1-15 microns. For example, the line width of the sub-electrode 2611 is 2-10 microns. For example, the line width of the sub-electrode 2611 is 5-12 microns. For example, the line width of the sub-electrode 2611 is 3-7 microns. For example, the ratio of the line width of the connection portion 2612 to the line width of the sub-electrode 2611 may be 0.5-1.5. For example, the ratio of the line width of the connection portion 2612 to the line width of the sub-electrode 2611 may be 0.7-1.2. For example, the ratio of the line width of the connection portion 2612 to the line width of the sub-electrode 2611 may be 0.9-1.1. For example, the line width of the connection portion 2612 may be identical to the line width of the sub-electrode 2611.

For example, as illustrated in FIG. 6, the first electrodes 261 in different regions 201 include the same number of sub-electrodes 2611 to improve the uniformity of light control in different regions.

In some examples, as illustrated in FIG. 6, the second electrode structure 270 includes a connection electrode 272 provided crosswise and a plurality of second electrodes 271 connected to the connection electrode 272. The second electrode structure is a common electrode shared by a plurality of regions, and setting the connection electrode of the second electrode structure in a grid shape is beneficial to reduce the difference between the signal at a position in the second electrode structure closer to a signal input terminal and the signal at a position in the second electrode structure farther away from the signal input terminal.

In the present disclosure, the light adjusting portion is also provided with a support post (PS) 281 between the first substrate 210 and the second substrate 220, optionally, the support post may be provided on a side of the first substrate or on a side of the second substrate. The vertical projection of the position of the support post on the first substrate may be on the gate line (at least partially overlapping with the gate line), or the vertical projection of the position of the support post on the first substrate is on the data line (at least partially overlapping with the data line). In the case where the position of the support post partially overlaps with the projection of the gate line or data line, the part of the gate line or data line corresponding to the overlapping portion may be designed to be widened (that is, the width is greater than the width of the part that does not overlap with the support post) to better support the support post.

For example, as illustrated in FIG. 6, the material of the connection electrode 272 is identical to the material of the second electrode 271. For example, the connection electrode 272 is formed as an integral structure with the second electrode 271. For example, the second electrodes 271 in different regions 201 are electrically connected to each other through the connection electrode 272.

For example, as illustrated in FIG. 6, the orthographic projection of the second electrode 271 on the first substrate 210 does not overlap with the orthographic projection of the signal line 250 on the first substrate 210. For example, the orthographic projection of the connection electrode 272 on the first substrate 210 overlaps with the orthographic projection of the signal line 250 on the first substrate 210.

In some examples, as illustrated in FIG. 6, the included angle between the extension direction of the second electrode 271 and the extension direction of the first signal line 251 is not greater than 10 degrees, and in at least one region 201, the plurality of sub-electrodes 2611 and the plurality of second electrodes 271 are arranged alternately along the first direction. For example, each region 201 is provided with at least two second electrodes 271. For example, in each region 201, the ratio of the total number of the sub-electrodes 2611 to the total number of the second electrodes 271 may be 0.9-1.1. For example, in each region 201, the total number of the sub-electrodes 2611 is equal to the total number of the second electrodes 271, or the total number of the two differs by one.

For example, as illustrated in FIG. 6, the extension direction of the second electrode 271 is parallel to the extension direction of the sub-electrode 2611.

In some examples, as illustrated in FIG. 6, the line width of the second electrode 271 may be 1-15 microns. For example, the line width of the second electrode 271 may be 7-12 microns. For example, the line width of the second electrode 271 may be 5-10 microns. For example, the ratio of the line width of the second electrode 271 to the line width of the sub-electrode 2611 is 0.06-15. For example, the ratio of the line width of the second electrode 271 to the line width of the sub-electrode 2611 is 0.1-12. For example, the ratio of the line width of the second electrode 271 to the line width of the sub-electrode 2611 is 0.3-10. For example, the ratio of the line width of the second electrode 271 to the line width of the sub-electrode 2611 is 0.5-5. For example, the line width of the second electrode 271 may be equal to the line width of the sub-electrode 2611, or may also be different from the line width of the sub-electrode 2611.

In some examples, as illustrated in FIG. 6, the distance between the sub-electrode 2611 and the second electrode 271 provided adjacent to each other may be 2-15 microns. For example, the distance between the sub-electrode 2611 and the second electrode 271 provided adjacent to each other may be 3-12 microns. For example, the distance between the sub-electrode 2611 and the second electrode 271 provided adjacent to each other may be 5-10 microns. For example, the distance between the sub-electrode 2611 and the second electrode 271 provided adjacent to each other may be 7-9 microns.

For example, as illustrated in FIG. 6, the sub-electrode 2611 and the second electrode 271 may have a single-domain structure or a multi-domain structure, which is not limited in the embodiments of the present disclosure.

In some examples, as illustrated in FIG. 6, the connection electrode 272 includes a plurality of first connection electrodes 2721 and a plurality of second connection electrodes 2722, the plurality of first connection electrodes 2721 and the plurality of first signal lines 251 are arranged alternately along the first direction, and the plurality of second connection electrodes 2722 and the plurality of second signal lines 252 are arranged alternately along the second direction. For example, the first connection electrode 2721 extends along the extension direction of the first signal line 251, and the second connection electrode 2722 extends along the extension direction of the second signal line 252.

For example, as illustrated in FIG. 6, the orthographic projection of the first connection electrode 2721 on the first substrate 210 overlaps with the orthographic projection of the second signal line 252 on the first substrate 210. For example, the orthographic projection of the second connection electrode 2722 on the first substrate 210 overlaps with the orthographic projection of the first signal line 251 on the first substrate 210.

For example, the connection portion 2612 is provided in parallel with the second connection electrode 2722.

In the display device provided by the present disclosure, the sub-electrode, the second electrode, and the first connection electrode in the region defined by the intersection of the first signal line and the second signal line are provided to be parallel to the first signal line, and the connection portion and the second connection electrode in the region defined by the intersection of the first signal line and the second signal line are provided to be parallel to the second signal line.

For example, as illustrated in FIG. 6, the second signal line 252, the second connection electrode 2722 and the connection portion 2612 are provided circularly in sequence along the second direction.

Figure 10:
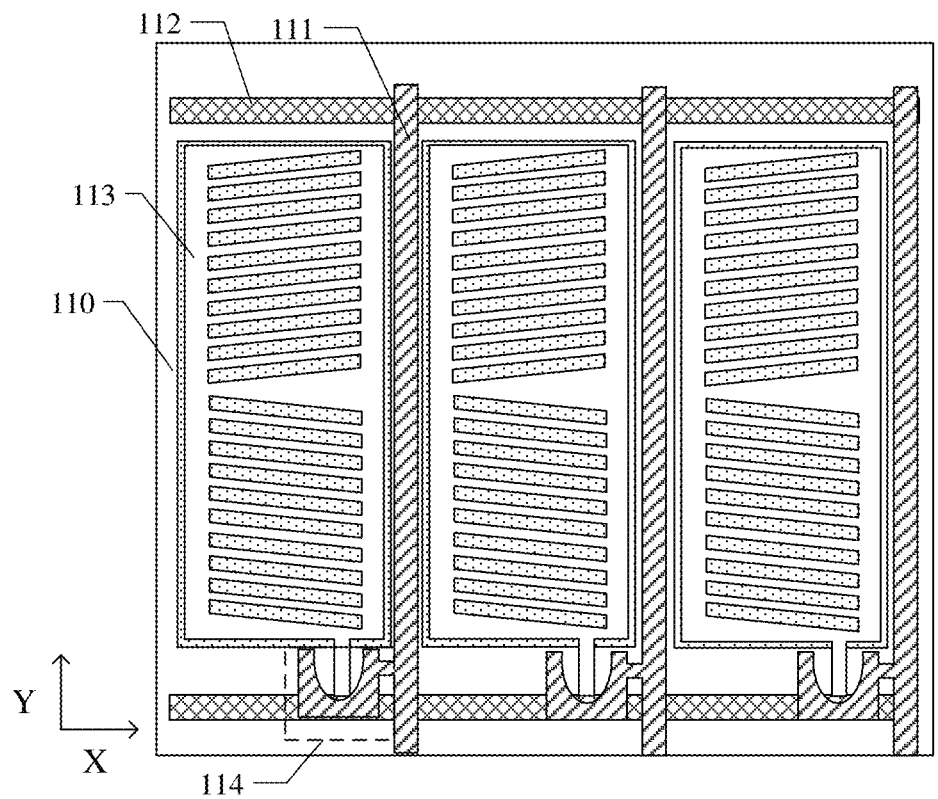
FIG. 10 is a schematic diagram of a partial planar structure of a display panel provided by the embodiments of the present disclosure.
Figure 11:
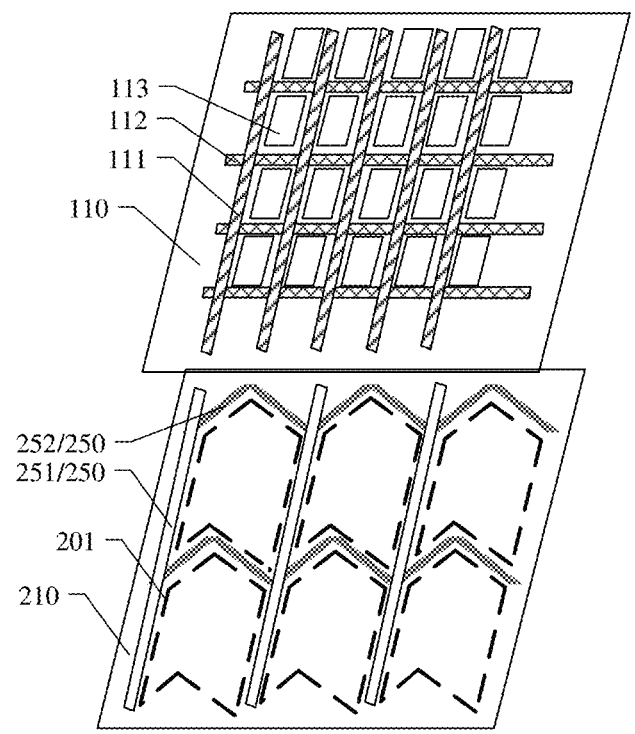
FIG. 11 is a schematic diagram of a stacked relationship between a display panel and a light adjusting portion.

FIG. 10 is a schematic diagram of a partial planar structure of a display panel provided by the embodiments of the present disclosure, and FIG. 11 is a schematic diagram of a stacked relationship between a display panel and a light adjusting portion.

For example, as illustrated in FIG. 5, FIG. 6, FIG. 10 and FIG. 11, the display panel includes a substrate 110 and a substrate 120 stacked with each other, and a liquid crystal layer 130 is provided between the substrate 110 and the substrate 120. For example, a side of the substrate 110 facing the liquid crystal layer 130 is provided with a plurality of data lines 111 arranged along a first direction and a plurality of gate lines 112 arranged along a second direction, and a sub-pixel 113 is provided in the region defined by the intersection of the data line 111 and gate line 112. For example, the sub-pixel 113 may include a pixel electrode and a common electrode, and the pixel electrode and the common electrode generate a voltage difference to drive the liquid crystals in the liquid crystal layer 130 to deflect. For example, a support post 172 is provided between the substrate 110 and the substrate 120, and a ring of sealant 171 is provided outside the liquid crystal layer 130. For example, a side of the substrate 120 facing the liquid crystal layer 130 is provided with a black matrix 141 and a color filter layer 142, and the color filter layer includes a red color filter, a green color filter and a blue color filter. The embodiments of the present disclosure are not limited thereto, and the data lines, gate lines and sub-pixels may also be provided on the side of the substrate 120 facing the liquid crystal layer 130.

For example, the embodiments of the present disclosure schematically illustrate that the display panel may be a liquid crystal display panel, such as a twisted nematic (TN) display panel, an advanced super dimension switch (ADS) display panel, a vertical alignment (VA) display panel, a reflective display panel or a transflective display panel, etc.

In some examples, as illustrated in FIG. 5, the display device further includes a first polarization structure 150 and a second polarization structure 160, the first polarization structure 150 is on a side of the display panel 100 away from the light adjusting portion 200, and the second polarization structure 160 is between the display panel 100 and the light adjusting portion 200. The polarization direction of the first polarization structure 150 intersects with the polarization direction of the second polarization structure 160. For example, the polarization direction of the polarized light emitted through the first polarization structure 150 intersects with the polarization direction of the polarized light emitted through the second polarization structure 160.

In some examples, as illustrated in FIG. 5, FIG. 6, FIG. 10 and FIG. 11, the display panel 100 includes a plurality of sub-pixels 113, the ratio of the total number of the plurality of sub-pixels 113 to the total number of the plurality of regions 201 is N, and N is not greater than 10. For example, the ratio of the size of one region 201 along the first direction to the size of one sub-pixel 113 along the first direction is not greater than 10, and the ratio of the size of one region 201 along the second direction to the size of one sub-pixel 113 along the second direction is not greater than 10. For example, the ratio of the area of one region 201 to the area of one sub-pixel 113 is not greater than 10. For example, the light passing through one region 201 may be emitted to N sub-pixels 113, where N is not greater than 10.

In the display device provided by the present disclosure, by setting the ratio of the size of the region where the first electrode is located in the light adjusting portion to the size of the sub-pixel in the display panel to be not greater than 10, each region corresponds to a smaller number of sub-pixels, which is beneficial to improving the partial dimming accuracy and display effect of the display device.

For example, as illustrated in FIG. 11, the ratio of the total number of the plurality of sub-pixels 113 to the total number of the plurality of regions 201 is 8. For example, the total number of sub-pixels 113 corresponding to one region 201 in one of the first direction and the second direction is 1, and the total number of sub-pixels 113 corresponding to one region 201 in the other direction of the first direction and the second direction is 8; or the total number of sub-pixels 113 corresponding to one region 201 in one of the first direction and the second direction is 2, and the total number of sub-pixels 113 corresponding to one region 201 in the other direction of the first direction and the second direction is 4.

For example, as illustrated in FIG. 11, the ratio of the total number of the plurality of sub-pixels 113 to the total number of the plurality of regions 201 is 6. For example, the total number of sub-pixels 113 corresponding to one region 201 in one of the first direction and the second direction is 1, and the total number of sub-pixels 113 corresponding to one region 201 in the other direction of the first direction and the second direction is 6; or the total number of sub-pixels 113 corresponding to one region 201 in one of the first direction and the second direction is 2, and the total number of sub-pixels 113 corresponding to one region 201 in the other direction of the first direction and the second direction is 3.

For example, as illustrated in FIG. 11, the ratio of the total number of the plurality of sub-pixels 113 to the total number of the plurality of regions 201 is 4. For example, the total number of sub-pixels 113 corresponding to one region 201 in one of the first direction and the second direction is 1, and the total number of sub-pixels 113 corresponding to one region 201 in the other direction of the first direction and the second direction is 4; or the total number of sub-pixels 113 corresponding to one region 201 in one of the first direction and the second direction is 2, and the total number of sub-pixels 113 corresponding to one region 201 in the other direction of the first direction and the second direction is 2.

For example, as illustrated in FIG. 11, the ratio of the total number of the plurality of sub-pixels 113 to the total number of the plurality of regions 201 is 2. For example, the total number of sub-pixels 113 corresponding to one region 201 in one of the first direction and the second direction is 1, and the total number of sub-pixels 113 corresponding to one region 201 in the other direction of the first direction and the second direction is 2.

For example, as illustrated in FIG. 11, the ratio of the total number of the plurality of sub-pixels 113 to the total number of the plurality of regions 201 is 1. For example, one region 201 corresponds to one sub-pixel 113.

In some examples, as illustrated in FIG. 11, the extension direction of the data line 111 is different from the extension direction of at least partial position of the first signal line 251, and the extension direction of the gate line 112 is different from the extension direction of at least partial position of the second signal line 252. In the display device provided by the present disclosure, setting the extension direction of at least partial position of the first signal line in the light adjusting portion to be different from the extension direction of the data line and setting the extension direction of at least partial position of the second signal line to be different from the extension direction of the gate line are beneficial to reduce or eliminate the moire phenomenon that may occur when the display device displays in the case where the display panel and the light adjusting portion are stacked with each other.

For example, as illustrated in FIG. 11, the included angle between the extension direction of the data line 111 and the extension direction of the at least partial position of the first signal line 251 is a first included angle, the included angle between the extension direction of the gate line 112 and the extension direction of the at least partial position of the second signal line 252 is a second included angle, and the first included angle is not greater than the second included angle. Because the included angle between the extension direction of the sub-electrode and the second electrode and the extension direction of the first signal line is small, the extension direction of the sub-electrode can have a larger included angle with the extension direction of the second signal line, and the first electrode does not overlap with the first signal line or the second signal line in a direction perpendicular to the first substrate. The present disclosure can better prevent the occurrence of the moire phenomenon by setting the extension direction of the first signal line to have a certain included angle with the extension direction of the data line as much as possible while preventing the first electrode from overlapping with the first signal line.

In some examples, as illustrated in FIG. 6 and FIG. 11, the display panel includes a plurality of data lines arranged along the first direction and a plurality of gate lines arranged along the second direction, and the extension direction of the data line is the same as the extension direction of the sub-electrode. In the display device provided by the present disclosure, by setting the relationship between the extension direction of the data line, the extension direction of the first signal line in the light adjusting portion, and the extension direction of the sub-electrode in the display panel, it is possible to prevent the first signal line from overlapping with the sub-electrode and affecting the area of the light adjusting region and prevent the first signal line from being parallel to the data line and generating the moire phenomenon, while achieving the sharing state by the deflection of the liquid crystals in the light adjusting portion in a specific direction to achieve the refraction of light in a specific direction.

In some examples, as illustrated in FIG. 6 and FIG. 11, at least one second signal line 252 includes a bent signal line. For example, each second signal line 252 is a periodically bent signal line. For example, the shape of each second signal line 252 corresponding to each region 201 may be "V" shape, "U" shape, etc. For example, the overall shape of each second signal line 252 is a plurality of "W" shapes connected to each other, or a plurality of arcs connected to each other. In the display device provided by the present disclosure, by setting the shape of the second signal line in the light adjusting portion to be bent, the extension direction of the second signal line can be different from the extension direction of the gate line in the display panel, which is beneficial to preventing moire phenomenon caused by a deviation between the second signal line in the light adjusting portion and the gate line in the display panel.

In some examples, as illustrated in FIG. 11, the orthographic projection of at least one data line 111 on the first substrate 210 overlaps with the orthographic projection of the first signal line 251 on the first substrate 210. Adjusting the positional relationship between the data line in the display panel and the first signal line in the light adjusting portion is beneficial to allowing the sub-pixels in the display panel to have a larger aperture ratio.

For example, as illustrated in FIG. 11, the ratio of the total number of the regions 201 to the total number of the sub-pixels 113 is 1, and the orthographic projections of more than 90% of the data lines 111 on the first substrate 210 overlap with the orthographic projections of the first signal lines 251 on the first substrate 210. For example, the ratio of the total number of the regions 201 to the total number of the sub-pixels 113 is 4, and the orthographic projections of more than 40% of the data lines on the first substrate 210 overlap with the orthographic projections of the first signal lines 251 on the first substrate 210. The total number of data lines overlapping with the first signal lines is related to the ratio of the total number of the regions to the total number of the sub-pixels, and according to the ratio of the total number of the regions to the total number of the sub-pixels, the total number of data lines overlapping with the first signal lines can be adjusted to maximize the aperture ratio of the sub-pixels in the display panel.

For example, as illustrated in FIG. 11, the ratio of the line width of the data line 111 to the line width of the first signal line 251 may be 0.8-1.2. For example, the line width of the data line 111 may be equal to the line width of the first signal line 251. For example, the ratio of the line width of the gate line 112 to the line width of the second signal line 252 may be 0.8-1.2. For example, the line width of the gate line 112 may be equal to the line width of the second signal line 252.

In some examples, as illustrated in FIG. 6 and FIG. 10, each sub-pixel 113 includes a thin film transistor 114, and the channel width-to-length ratio of the thin film transistor 114 is not greater than the channel width-to-length ratio of the switch transistor 300. For example, the channel width-to-length ratio of the thin film transistor 114 in the display panel 100 is smaller than the channel width-to-length ratio of the switch transistor 300 in the light adjusting portion 200.

In the display device provided by the present disclosure, the relationship between the channel width-to-length ratio of the switch transistor in the light adjusting portion and the channel width-to-length ratio of the thin-film transistor in the display panel is adjusted according to the ratio of the total number of the regions in the light adjusting portion to the total number of the sub-pixels in the display panel, so that the light adjusting portion can better adjust the light exit state of the display device.

For example, as illustrated in FIG. 6 and FIG. 10, the shapes or materials of the switch transistor 300 in the light adjusting portion 200 and the thin film transistor 114 in the display panel 100 may be the same or be different, and the embodiments of the present disclosure are not limited thereto.

Figure 12:
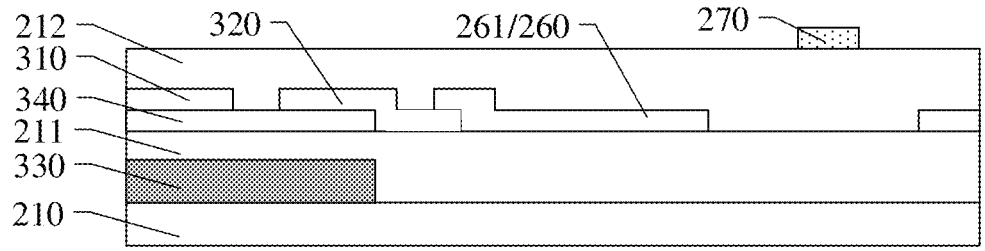
FIG. 12 and FIG. 13 are schematic diagrams of partial cross-sectional structures taken along a line AA' illustrated in FIG. 6 in different examples.
Figure 13:
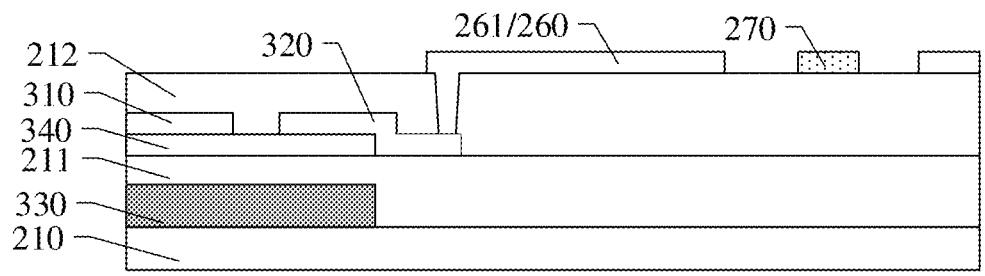

FIG. 12 and FIG. 13 are schematic diagrams of partial cross-sectional structures taken along the line AA' illustrated in FIG. 6 in different examples.

In some examples, as illustrated in FIG. 5, FIG. 6 and FIG. 12, the first electrode structure 260 is between the second electrode structure 270 and the first substrate 210. For example, the first electrode 261 in the first electrode structure 260 may cover part of the surface of the second electrode 320 of the switch structure 300 to be electrically connected to the second electrode 320 of the switch structure 300.

For example, as illustrated in FIG. 6 and FIG. 12, the first electrode structure 260 and the first signal line 251 may be provided in the same layer. For example, the material of the first electrode structure 260 is different from the material of the first signal line 251. For example, the material of the first signal line 251 includes a metal material, for example, the first signal line 251 may be made of a metal such as molybdenum (Mo), aluminum (Al), copper (Cu), titanium (Ti), etc., or multilayer combinations or alloys thereof. For example, the second signal line 252 may be between the first signal line 251 and the first substrate 210. For example, the material of the second signal line 252 includes a metal material, for example, the second signal line 252 may be made of a metal such as molybdenum (Mo), aluminum (Al), copper (Cu), titanium (Ti), etc., or multilayer combinations or alloys thereof. For example, the second signal line 252 is provided in the same layer as the gate electrode 330 of the switch structure 300. For example, the gate electrode 330 of the switch structure 300 and the second signal line 252 may be an integral structure, for example, the gate electrode 330 may be a part of the second signal line 252 overlapping with the active layer 340. For example, the first electrode 310 of the switch structure 300 and the first signal line 251 may also be an integral structure.

The above-mentioned "same layer" may refer to a layer structure formed by using the same film-forming process to form a film layer for forming a specific pattern, and then formed by using the same mask through one patterning process. That is, one patterning process corresponds to one mask. According to different specific patterns, one patterning process may include multiple exposure, development or etching processes, and the specific patterns in the formed layer structure may be continuous or discontinuous, and these specific patterns may be at the same height or have the same thickness, or may be at different heights or have different thicknesses.

For example, as illustrated in FIG. 12, an insulation layer 211 covering the gate electrode 330 is provided between the first electrode structure 260 and the first substrate 210. For example, the material of the insulation layer 211 may be silicon nitride, silicon oxide, or silicon oxynitride, etc.

For example, as illustrated in FIG. 12, an insulation layer 212 covering the first electrode structure 260 is provided on a side of the first electrode structure 260 away from the first substrate 210. For example, the material of the insulation layer 212 may be silicon nitride, silicon oxide, or silicon oxynitride, etc. For example, the insulation layer 212 is between the first electrode structure 260 and the second electrode structure 270.

For example, the difference between the light adjusting portion illustrated in FIG. 13 and the light adjusting portion illustrated in FIG. 12 is that, in the light adjusting portion illustrated in FIG. 13, the first electrode structure 260 and the second electrode structure 270 are provided in the same layer. The first signal line, the second signal line, the switch structure 300, the first substrate 210, and the insulation layer 211 in the light adjusting portion illustrated in FIG. 13 may have the same characteristics as the first signal line, the second signal line, the switch structure 300, the first substrate 210, and the insulation layer 211 in the light adjusting portion illustrated in FIG. 12, and details will not be repeated here.

For example, as illustrated in FIG. 13, the first electrode structure 260 is electrically connected to the second electrode 320 of the switch structure 300 through a via in the insulation layer 212.

In some examples, as illustrated in FIG. 5, the light adjusting portion 200 further includes a black matrix 283, and the orthographic projection of the black matrix 283 on the first substrate 210 covers at least part of the orthographic projections of the plurality of first signal lines 251 and the plurality of second signal lines 252 on the first substrate 210 to prevent reflection of light on the first signal lines and the second signal lines.

For example, the orthographic projections of the plurality of first signal lines 251 on the first substrate 210 are completely within the orthographic projection of the black matrix 283 on the first substrate 210. For example, the orthographic projections of the plurality of second signal lines 252 on the first substrate 210 are completely within the orthographic projection of the black matrix 283 on the first substrate 210. For example, the shape of the black matrix 283 is a grid.

For example, the orthographic projection of the black matrix 283 on the first substrate 210 overlaps with part of the edge of the region 201, but does not overlap with the center of the region 201. For example, the portion of the orthographic projection of the black matrix 283 on the first substrate 210 that overlaps with the region 201 accounts for less than 20% of the area of the region 201.

For example, the black matrix 283 may be between the liquid crystal layer 230 and the second substrate 220. For example, the black matrix 283 may be on the second substrate 220.

For example, the light adjusting portion may be an active light adjusting portion, and a peripheral wiring pattern may be provided in the light adjusting portion outside the display region. For example, the peripheral wiring pattern may be integrated on an array substrate and using a gate driver (GOA, Gate Driven on Array).

Figure 14:
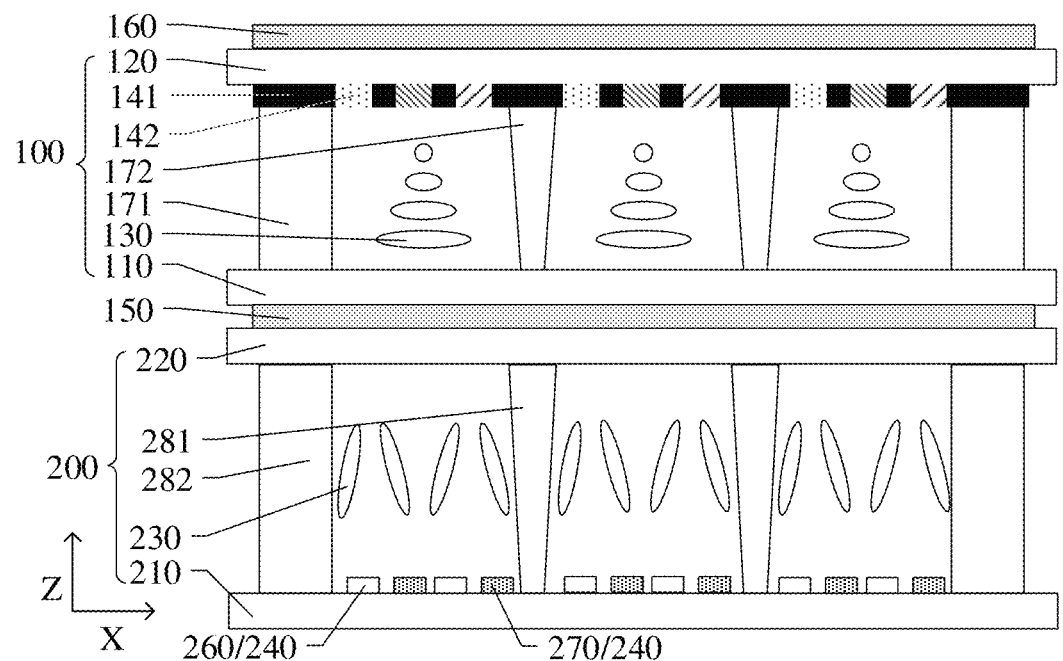
FIG. 14 is a schematic structural diagram of a display device provided by another example of the embodiments of the present disclosure.
Figure 15:
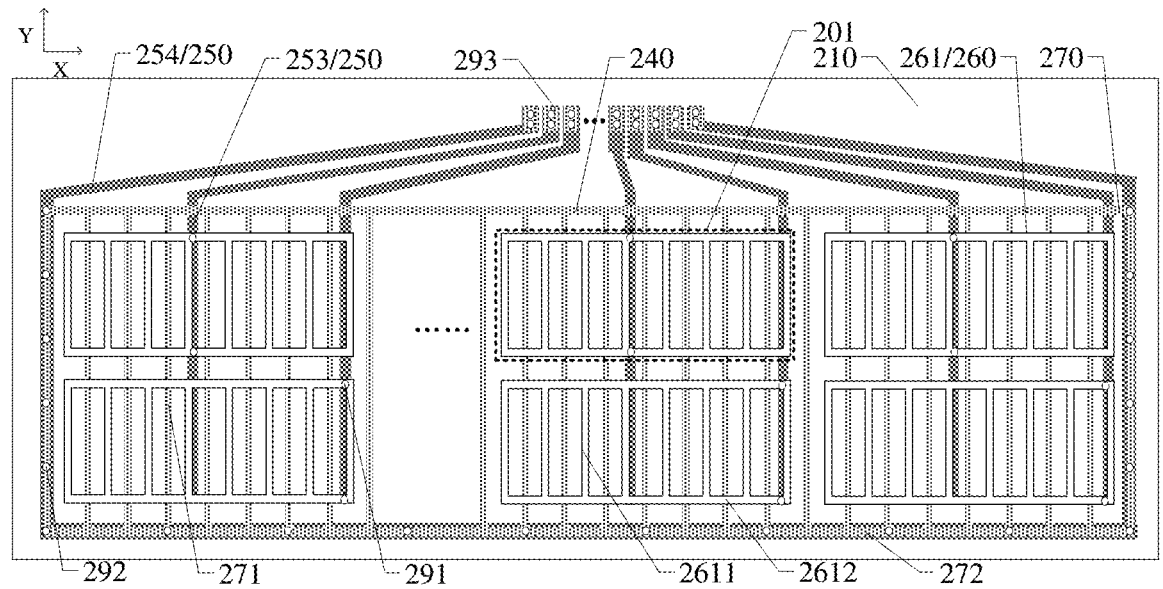
FIG. 15 is a schematic diagram of a partial planar structure of an example of the light adjusting portion in the display device illustrated in FIG. 14.

FIG. 14 is a schematic structural diagram of a display device provided by another example of the embodiments of the present disclosure, and FIG. 15 is a schematic diagram of a partial planar structure of an example of the light adjusting portion in the display device illustrated in FIG. 14. The display panel 100, the first polarization structure 150, and the second polarization structure 160 in the display device illustrated in FIG. 14 may have the same characteristics as the display panel 100, the first polarization structure 150, and the second polarization structure 160 in the display device illustrated in FIG. 5, which will not be repeated here. The first substrate 210, the second substrate 220 and the refractive index variable material layer 230 in the light adjusting portion 200 illustrated in FIG. 14 have the same characteristics as the first substrate 210, the second substrate 220 and the refractive index variable material layer 230 in the light adjusting portion 200 illustrated in FIG. 5, which will not be repeated here.

As illustrated in FIG. 14 and FIG. 15, the light adjusting portion 200 includes a plurality of signal lines 250, and the electrode structure 240 and the plurality of signal lines 250 are all on the first substrate 210. The embodiments of the present disclosure are not limited thereto, and the plurality of signal lines and the electrode structure may also be all on the second substrate, for example, the plurality of signal lines and the electrode structure are all on the same substrate.

As illustrated in FIG. 14 and FIG. 15, the electrode structure 240 includes a first electrode structure 260 and a second electrode structure 270, the first electrode structure 260 includes a plurality of first electrodes 261 insulated from each other, the first substrate 210 includes a plurality of regions 201, and the first electrodes 261 in at least two regions 201 are configured to be electrically connected to different signal lines 250 to achieve the partition control of the light adjusting portion 200. For example, the plurality of first electrodes 261 are provided in the same layer. For example, the first electrodes 261 in different regions 201 are insulated from each other. For example, each region 201 is provided with one first electrode 261. The regions 201 in this example may be divided by the location of the first electrodes 261, each first electrode 261 is in one region 201, and different first electrodes 261 are in different regions 201.

The display device provided by the present disclosure is applied to the privacy-sharing switching technology, and by providing a plurality of signal lines in the light adjusting portion and electrically connecting different first electrodes in different regions of the first electrode structure to different signal lines, it is possible to achieve that the light incident into the light adjusting portion can be independently controlled in different regions of the light adjusting portion, which in turn achieves that the privacy state-sharing state switching is carried out independently for any specified region in the display device, and improves the user's using experience.

In some examples, as illustrated in FIG. 15, portions of the plurality of signal lines 250 are electrically connected to the plurality of first electrodes 261 in one-to-one correspondence. For example, the total number of the signal lines 250 is not less than the total number of the first electrodes 261. For example, the signal lines 250 include a plurality of first sub-signal lines 253 electrically connected to a plurality of first electrodes 2601.

In some examples, as illustrated in FIG. 15, the first electrode structure 260 and the second electrode structure 270 are provided in different layers. For example, the orthographic projection of the first electrode structure 260 on the first substrate 210 overlaps with the orthographic projection of the second electrode structure 270 on the first substrate 210. For example, both the first electrode structure 260 and the second electrode structure 270 are provided in a different layer from the signal line 250. For example, the orthographic projection of the first electrode structure 260 on the first substrate 210 overlaps with the orthographic projection of the signal line 250 on the first substrate 210. For example, the orthographic projection of the second electrode structure 270 on the first substrate 210 overlaps with the orthographic projection of the signal line 250 on the first substrate 210.

In some examples, as illustrated in FIG. 15, at least one of the plurality of signal lines 250 is electrically connected to the second electrode structure 270. For example, the signal lines 250 include a second sub-signal line 254 electrically connected to the second electrode structure 270. For example, the second electrode structure 270 may be a common strip electrode shared by the plurality of regions 201.

For example, as illustrated in FIG. 15, the first electrode structure 260 is electrically connected to the first sub-signal line 253 through the vias 291 in the insulation layer between the first electrode structure 260 and the signal line 250, and the second electrode structure 270 is electrically connected to the second sub-signal line 254 through the vias 292 in the insulation layer between the second electrode structure 270 and the signal line 250. The total number of the vias 291 and the total number of the vias 292 can be set according to electrical requirements and process requirements. For example, the signal line 250 may be between the electrode structure 240 and the first substrate 210.

The difference between the light adjusting portion illustrated in FIG. 15 and the light adjusting portion illustrated in FIG. 6 is that there is no switch structure in the light adjusting portion illustrated in FIG. 15, the signal line electrically connected to the first electrode directly transmits the signal to the first electrode, and the signal line electrically connected to the second electrode structure directly transmits the signal to the second electrode structure to from a voltage difference between the first electrode structure and the second electrode structure. The difference between the light adjusting portion illustrated in FIG. 15 and the light adjusting portion illustrated in FIG. 6 is that the total number of signal lines in the light adjusting portion illustrated in FIG. 15 is less than the total number of first signal lines illustrated in FIG. 6, and the light adjusting portion illustrated in FIG. 15 does not have a black matrix. The further difference between the light adjusting portion illustrated in FIG. 15 and the light adjusting portion illustrated in FIG. 6 is that the ratio of the total number of regions 201 in the light adjusting portion to the total number of sub-pixels in the display panel illustrated in FIG. 15 is greater than the ratio of the total number of regions 201 in the light adjusting portion to the total number of sub-pixels in the display panel illustrated in FIG. 6. The light adjusting portion illustrated in FIG. 6 is suitable for partial light adjusting in a small area region, and the light adjusting portion illustrated in FIG. 15 is suitable for partial light adjusting in a large area region.

For example, in the initial state, the refractive index variable material layer, such as the liquid crystal layer, is not applied with any driving signal (that is, there is no voltage difference between the first electrode structure 260 and the second electrode structure 270), the liquid crystal layer does not change the propagation direction of the light incident into the light adjusting portion 200, and when the light incident into the light adjusting portion 200 has basically no side viewing angle, the light emitted from the light adjusting portion 200 still has basically no side viewing angle, and in this case, the display device is in the privacy state.

For example, when there is a voltage difference between the first electrode structure 260 and the second electrode structure 270 to apply a driving signal to the liquid crystal layer, the liquid crystals deflect, and the liquid crystal layer changes the propagation direction of part of the light entering the liquid crystal layer. For example, when the light incident into the light adjusting portion 200 has basically no side viewing angle, the deflected liquid crystals allow some of the light to be dispersed, such as dispersing light of the front viewing angle or close to the front viewing angle into a large viewing angle direction, and in this case, the display device is in the sharing state.

For example, as illustrated in FIG. 15, each first electrode 261 is individually provided with a signal by a corresponding first sub-signal line 253, thus, switching between the privacy state and the sharing state in a designated region of the display device can be achieved by individually controlling each first electrode, i.e., the liquid crystals corresponding to each first partial region, to achieve the partial privacy effect.

For example, the electrode structure 240 may be a light-transmitting electrode structure, for example, the material of the electrode structure 240 may be a transparent conductive material such as indium tin oxide (ITO).

For example, different voltages are applied to the first electrode structure 260 and the second electrode structure 270 to form a voltage difference during the operating process of the light adjusting portion 200. For example, the first electrode structure 260 and the second electrode structure 270 may be applied with a positive voltage and a negative voltage, respectively.

For example, as illustrated in FIG. 15, the second electrode structure 270 is input with a first voltage by the second sub-signal line 254, the first electrode 261 in the first partial region in the plurality of regions 201 is input with a second voltage by a corresponding first sub-signal line 253, the second voltage is different from the first voltage, and the first electrode 261 in the second partial region in the plurality of regions 201 is input with the first voltage by a corresponding first sub-signal line 253. There is a voltage difference between the first electrode structure 260 and the second electrode structure 270 in the first partial region, the liquid crystals corresponding to the first partial region is deflected, and the light passing through the first partial region is refracted by the liquid crystals, so that the first partial region is in the sharing state. However, there is no voltage difference between the first electrode structure 260 and the second electrode structure 270 in the second partial region, the liquid crystals corresponding to the second partial region are not deflected, and the propagation direction of light passing through the second partial region does not change, so that the second partial region is in the privacy state.

In some examples, as illustrated in FIG. 15, the first electrode 261 includes a plurality of sub-electrodes 2611 arranged along the first direction, the second electrode structure 270 includes a plurality of second electrodes 271 arranged along the first direction, the plurality of sub-electrodes 2611 and the plurality of second electrodes 271 are arranged alternately along the first direction, and the first direction intersects with the second direction. FIG. 15 schematically illustrates that the X direction is the first direction, and the Y direction is the second direction, but the embodiments are not limited thereto, and the first direction and the second direction can be interchanged. For example, the sub-electrode 2611 extends along the second direction, and the second electrode 271 extends along the second direction.

For example, as illustrated in FIG. 15, a plurality of first electrodes 261 may be arranged in an array along the X direction and the Y direction, but the embodiments are not limited thereto, the plurality of first electrodes may be arranged in a row only along the X direction, or arranged in a column only along the Y direction.

For example, as illustrated in FIG. 15, the length of the sub-electrode 2611 is smaller than the length of the second electrode 271.

In some examples, as illustrated in FIG. 15, the first electrode 261 further includes a first sub-connection portion 2612 electrically connected to the plurality of sub-electrodes 2611, and the second electrode structure 270 further includes a second sub-connection portion 272 electrically connected to the plurality of second electrodes 271. For example, the material of the first sub-connection portion 2612 may be identical to the material of the sub-electrode 2611. For example, the first sub-connection portion 2612 and the sub-electrode 2611 may be formed as an integral structure. For example, the first sub-connection portion 2612 and the sub-electrode 2611 may be formed in the same patterning process. For example, the material of the second electrode 271 may be identical to the material of the second sub-connection portion 272. For example, the second electrode 271 and the second sub-connection portion 272 may be formed as an integral structure. For example, the second electrode 271 and the second sub-connection portion 272 may be formed in the same patterning process.

For example, as illustrated in FIG. 15, each first electrode 261 includes at least one first sub-connection portion 2612. For example, FIG. 15 schematically illustrates that each first electrode 261 includes two first sub-connection portions 2612 to form a grid structure with a plurality of sub-electrodes 2611. The embodiments of the present disclosure are not limited thereto, and the first electrode may also include three or more first sub-connection portions.

For example, as illustrated in FIG. 15, the first sub-connection portion 2612 may be a straight line extending along the first direction, but the embodiments are not limited thereto, and the first sub-connection portion may also be in the shape of a polyline, an arc, or the like.

For example, as illustrated in FIG. 15, the second sub-connection portion 272 may be a straight line extending along the first direction, but the embodiments are not limited thereto, and the second sub-connection portion may also be in the shape of a polyline, an arc, or the like.

For example, as illustrated in FIG. 15, the total number of the second sub-connection portions 272 is greater than or equal to one. FIG. 15 schematically illustrates that the total number of the second sub-connection portions is two, but the embodiments are not limited thereto, and the total number of second sub-connection portions may be three or more. For example, the plurality of first electrodes 261 are all provided between two second sub-connection portions 272. For example, the plurality of first connection electrodes 2721 are all provided between two outermost second electrodes 271. For example, at least one of the two outermost second electrodes 271 is electrically connected to the second sub-signal line 254.

For example, as illustrated in FIG. 15, the first sub-connection portion 2612 overlaps with the first sub-signal line 253, and both the first sub-signal line 253 and the second sub-signal line 254 overlap with the second sub-connection portion 272.

For example, as illustrated in FIG. 15, one first electrode 261 overlaps with at least one first sub-signal line 253, and the one first electrode 261 is electrically connected to one first sub-signal line 253 overlapping with the one first electrode 261.

For example, as illustrated in FIG. 15, the signal line 250 includes a portion overlapping with the electrode structure 240 and a fan-shaped portion not overlapping with the electrode structure 240.

In some examples, as illustrated in FIG. 15, the shape of at least one signal line 520 at a partial position overlapping with the first electrode 261 in the direction perpendicular to the first substrate 210 is straight. The shape of each signal line 520 at a partial position overlapping with the first electrode 261 in the direction perpendicular to the first substrate 210 is straight. For example, the straight portion of the signal line extends along the second direction.

For example, as illustrated in FIG. 15, the line width of the sub-electrode 2611 is 1-15 microns. For example, the line width of the sub-electrode 2611 is 2-10 microns. For example, the line width of the sub-electrode 2611 is 5-12 microns. For example, the line width of the sub-electrode 2611 is 3-7 microns. For example, the ratio of the line width of the first sub-connection portion 2612 to the line width of the sub-electrode 2611 may be 0.5-1.5. For example, the ratio of the line width of the first sub-connection portion 2612 to the line width of the sub-electrode 2611 may be 0.7-1.2. For example, the ratio of the line width of the first sub-connection portion 2612 to the line width of the sub-electrode 2611 may be 0.9-1.1. For example, the line width of the first sub-connection portion 2612 may be equal to the line width of the sub-electrode 2611.

For example, as illustrated in FIG. 15, the line width of the second electrode 271 may be 1-15 microns. For example, the line width of the second electrode 271 may be 7-12 microns. For example, the line width of the second electrode 271 may be 5-10 microns. For example, the ratio of the line width of the second electrode 271 to the line width of the sub-electrode 2611 is 0.06-15. For example, the ratio of the line width of the second electrode 271 to the line width of the sub-electrode 2611 is 0.1-12. For example, the ratio of the line width of the second electrode 271 to the line width of the sub-electrode 2611 is 0.3-10. For example, the ratio of the line width of the second electrode 271 to the line width of the sub-electrode 2611 is 0.5-5. For example, the line width of the second electrode 271 may be equal to the line width of the sub-electrode 2611, and may be different from the line width of the sub-electrode 2611.

For example, as illustrated in FIG. 15, the distance between the sub-electrode 2611 and the second electrode 271 provided adjacent to each other may be 2-15 microns. For example, the distance between the sub-electrode 2611 and the second electrode 271 provided adjacent to each other may be 3-12 microns. For example, the distance between the sub-electrode 2611 and the second electrode 271 provided adjacent to each other may be 5-10 microns. For example, the distance between the sub-electrode 2611 and the second electrode 271 provided adjacent to each other may be 7-9 microns.

For example, the material of the signal line 250 includes a metal material, for example, the signal line 250 may be made of a metal such as molybdenum (Mo), aluminum (Al), copper (Cu), titanium (Ti), etc., or multilayer combinations or alloys thereof.

For example, as illustrated in FIG. 15, each first sub-signal line 253 is electrically connected to a different terminal 293. For example, the first sub-signal line 253 and the second sub-signal line 254 are electrically connected to different terminals 293.

For example, the light adjusting portion illustrated in FIG. 15 may be a passive light adjusting portion, and the light adjusting portion does not require a separate integrated circuit chip (IC) for driving to reduce costs. For example, the light adjusting portion does not require wiring such as GOA to reduce the dimension of the frame.

For example, as illustrated in FIG. 15, the regions 201 may be arranged in a 2*20 array. For example, the light adjusting portion 200 includes two rows of regions 201, and each row of regions 201 has 20 regions. For example, the light adjusting portion can be applied to a vehicle display environment.

Figure 16:
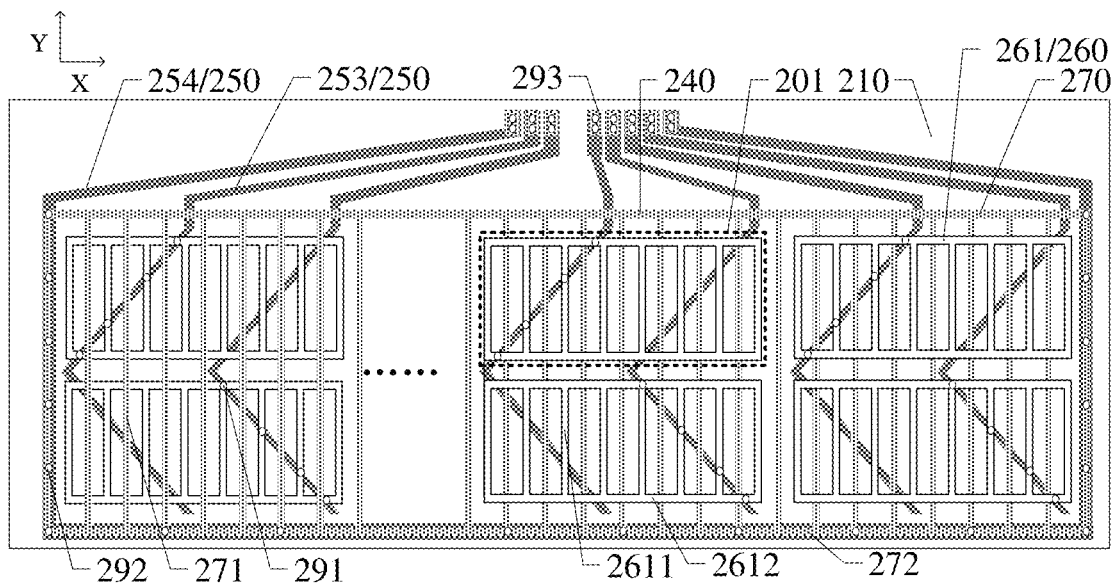
FIG. 16 is a schematic diagram of a partial planar structure of another example of the light adjusting portion in the display device illustrated in FIG. 14.

FIG. 16 is a schematic diagram of a partial planar structure of another example of the light adjusting portion in the display device illustrated in FIG. 14. The difference between the light adjusting portion illustrated in FIG. 16 and the light adjusting portion illustrated in FIG. 15 is that the shape of at least one signal line 250 at a partial position overlapping with the first electrode 261 in the direction perpendicular to the first substrate 210 is bent. Other characteristics of the light adjusting portion illustrated in FIG. 16 except for the shape of the signal line may be the same as other characteristics of the light adjusting portion illustrated in FIG. 15 except for the shape of the signal line, and will not be repeated here.

For example, as illustrated in FIG. 16, the shape of each signal line 250 at a partial position overlapping with the first electrode 261 in the direction perpendicular to the first substrate 210 is a "Z" shape or an "S" shape.

Figure 17:
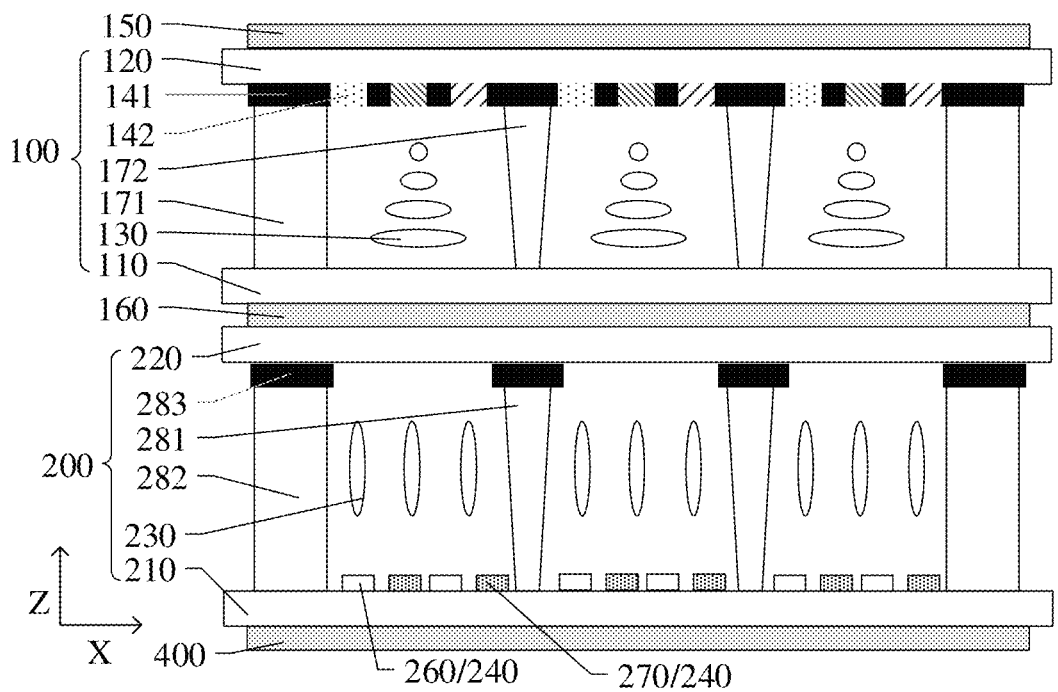
FIG. 17 is a partial structural diagram of a display device provided by the embodiments of the present disclosure.

FIG. 17 is a partial structural diagram of a display device provided by the embodiments of the present disclosure. As illustrated in FIG. 17, the display device further includes a third polarization structure 400, and the third polarization structure 400 is on a side of the light adjusting portion 200 away from the display panel 100. The polarization direction of the third polarization structure 400 is identical to the polarization direction of the second polarization structure 160. For example, the polarization direction of a linearly polarized light passing through the third polarization structure 400 is identical to the polarization direction of a linearly polarized light passing through the second polarization structure 160, the switching between the sharing state and the privacy state is achieved by adjusting the voltage difference of the electrodes in the light adjusting portion and the filtering effect of the polarizer, and the specific principle can refer to FIG. 1.

The display device achieves the switching between the privacy state and the sharing state through the arrangement of the first polarization structure, the second polarization structure and the third polarization structure.

Figure 18:
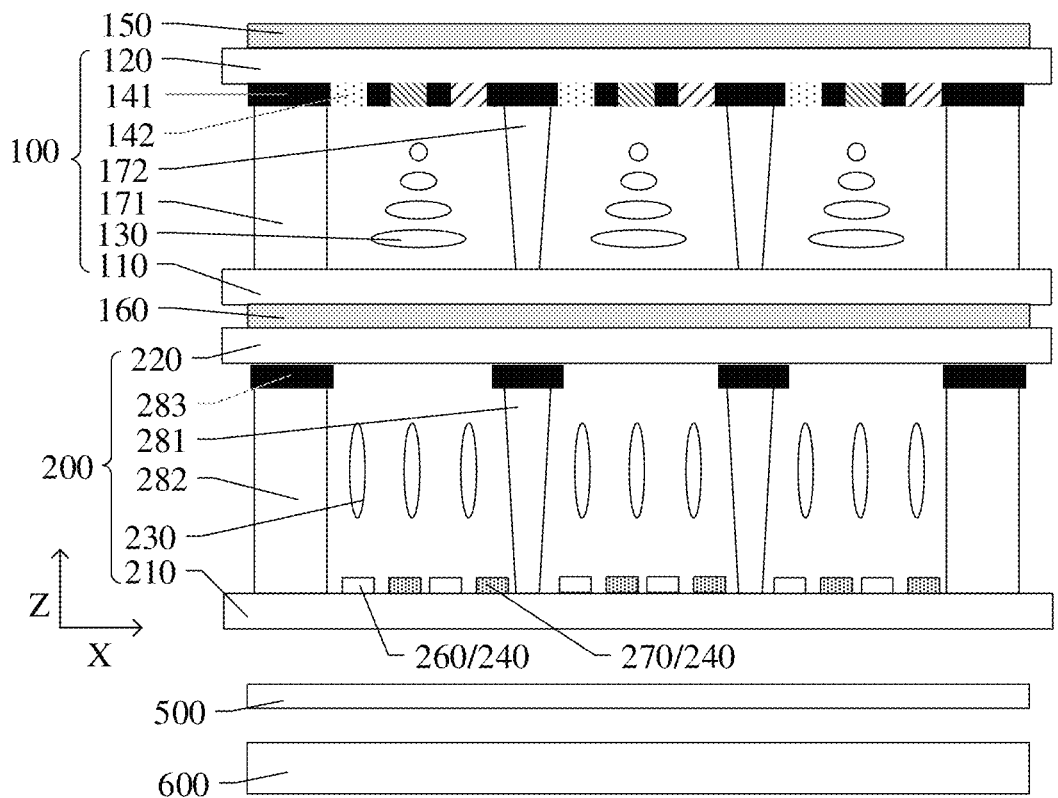
FIG. 18 is a partial structural diagram of a display device provided by an example of the embodiments of the present disclosure.

FIG. 18 is a partial structural diagram of a display device provided by an example of the embodiments of the present disclosure. As illustrated in FIG. 18, the display device further includes a backlight structure 600, and the backlight structure 600 is stacked with the light adjusting portion 200 and the display panel 100.

In some examples, as illustrated in FIG. 18, the light adjusting portion 200 is between the backlight structure 600 and the display panel 100. In FIG. 18, no polarizer is provided on the side close to the backlight structure, the switching between the shared state and the privacy state is achieved by adjusting the voltage difference of the electrodes in the light adjusting portion, and the specific principle can refer to FIG. 4.

In some examples, as illustrated in FIG. 18, the display device further includes an anti-peeping film 500, and the anti-peeping film 500 is on a light incident side of the light adjusting portion 200. For example, the anti-peeping film 500 is between the backlight structure 600 and the light adjusting portion 200.

For example, as illustrated in FIG. 18, the anti-peeping film 500 may be a structure in which a black material is arranged in a louver structure.

For example, as illustrated in FIG. 18, the backlight structure 600 may include a non-collimated common backlight and two layers of dichroic prisms, or include a collimated backlight and a layer of inverse prisms, so that the light entering the light adjusting portion is a collimated light with a high degree of collimation.

For example, as illustrated in FIG. 18, the combination of the collimated backlight structure 600 and the anti-peeping film 500 can form a light source with very high collimation. Of course, the embodiments of the present disclosure are not limited thereto, and the backlight structure may also adopt other light sources, such as a direct-lit backlight, a side-lit backlight, and the like.

Figure 19:
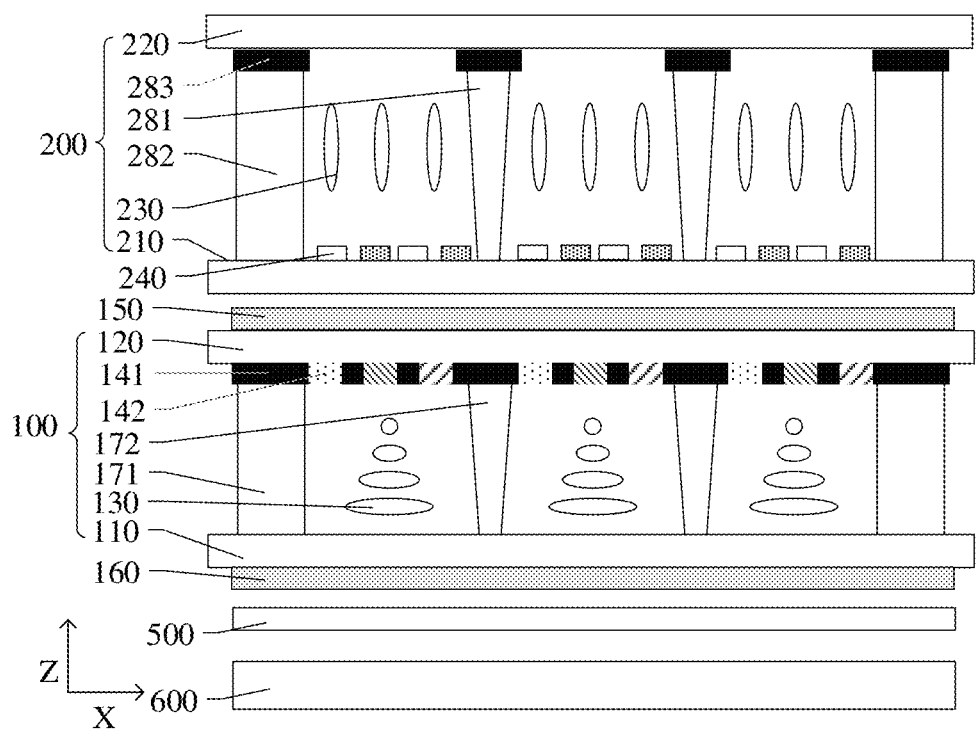
FIG. 19 is a partial structural diagram of a display device provided by an example of the embodiments of the present disclosure.

FIG. 19 is a partial structural diagram of a display device provided by an example of the embodiments of the present disclosure. The difference between the display device illustrated in FIG. 19 and the display device illustrated in FIG. 18 lies in the positions of the light adjusting portion 200 and the display panel 100.

For example, as illustrated in FIG. 19, the display panel 100 is between the light adjusting portion 200 and the backlight structure 600. For example, the anti-peeping film 500 is between the display panel 100 and the backlight structure 600.

Figure 20:
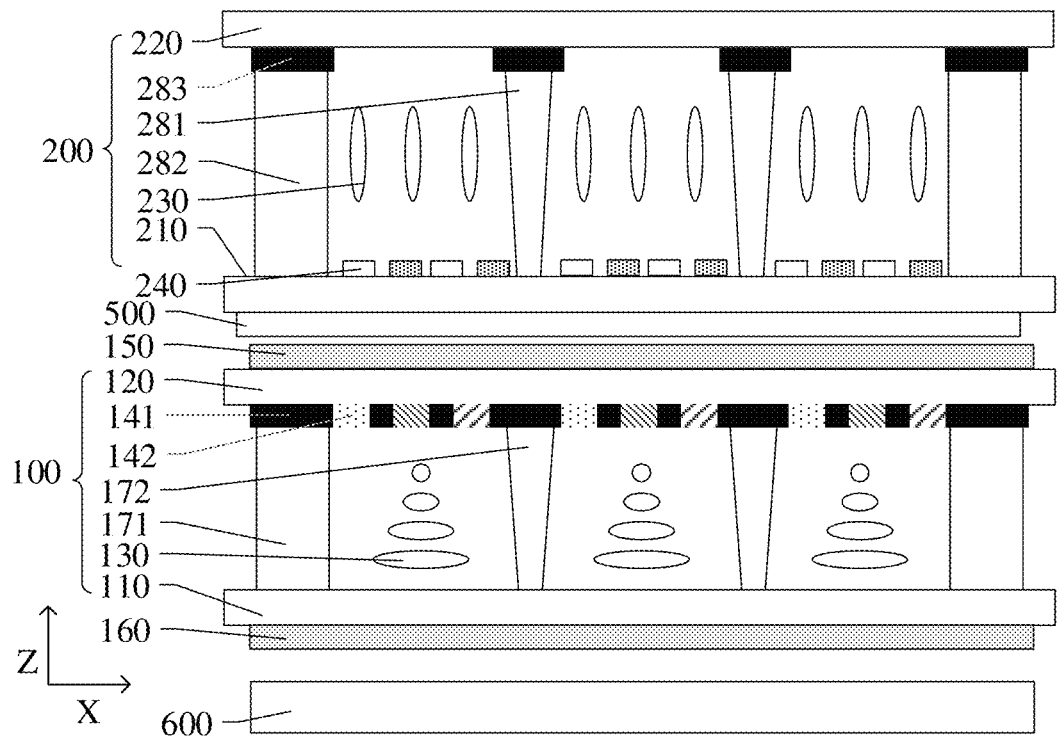
FIG. 20 is a partial structural diagram of a display device provided by an example of the embodiments of the present disclosure.

FIG. 20 is a partial structural diagram of a display device provided by an example of the embodiments of the present disclosure. The difference between the display device illustrated in FIG. 20 and the display device illustrated in FIG. 19 lies in the positions of the anti-peeping film 500 and the display panel 100. For example, as illustrated in FIG. 20, the anti-peeping film 500 is between the display panel 100 and the light adjusting portion 200.

FIG. 17 to FIG. 20 schematically illustrate that the light adjusting portion is the light adjusting portion illustrated in FIG. 5, but the embodiments are not limited thereto, and the light adjusting portion may also be the light adjusting portion illustrated in FIG. 14.

The embodiments of the present disclosure schematically illustrate that the display panel is a liquid crystal display panel, but the embodiments are not limited thereto. The display panel may also be an organic light-emitting diode display panel, or a mini light-emitting diode display panel. The display device is not provided with a backlight structure, and the light adjusting portion is on a light exit side of the display panel.

For example, the above-mentioned display device provided by the embodiments of the present disclosure may be any product or component with a display function such as a mobile phone, a tablet computer, a television, a monitor, a notebook computer, a digital photo frame, a navigator, a smart watch, a fitness wristband, a personal digital assistant, and the like. The display device includes but not limited to: a radio frequency unit, a network module, an audio output & input unit, a sensor, a user input unit, an interface unit, a memory, a processor, a power supply, and the like. In addition, those skilled in the art can understand that the above-mentioned structure does not constitute a limitation on the above-mentioned display device provided by the embodiments of the present disclosure. In other words, the above-mentioned display device provided by the embodiments of the present disclosure may include more or less of the above-mentioned components, or combine certain components, or adopt different component arrangements.

The following statements should be noted:

(1) The drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only exemplary embodiments of the present disclosure, and are not intended to limit the protection scope of the present disclosure, and the protection scope of the present disclosure is determined by the appended claims.

The invention claimed is:

1. A display device, comprising:
a display panel;
a light adjusting portion, stacked with the display panel, wherein the light adjusting portion comprises a first substrate, a refractive index variable material layer, an electrode structure, and a second substrate stacked with each other, and the refractive index variable material layer and the electrode structure are between the first substrate and the second substrate;
the light adjusting portion further comprises a plurality of signal lines, and the electrode structure and the plurality of signal lines are on the first substrate; and
the electrode structure comprises a first electrode structure and a second electrode structure, the first electrode structure comprises a plurality of first electrodes insulated from each other, the first substrate comprises a plurality of regions, and first electrodes in different regions are configured to be electrically connected to different signal lines to achieve partition control of the light adjusting portion;
the display panel comprises a plurality of sub-pixels, a ratio of a total number of the plurality of sub-pixels to a total number of the plurality of regions is N, and N is not greater than 10.

2. The display device according to claim 1, wherein the light adjusting portion further comprises a plurality of switch structures on the first substrate, each of the plurality of regions is provided with at least one switch structure, the plurality of signal lines comprise a plurality of first signal lines arranged along a first direction, a first electrode of each of the plurality of switch structures is electrically connected to a corresponding first signal line, and a second electrode of each of the plurality of switch structures is electrically connected to a corresponding first electrode.

3. The display device according to claim 2, wherein the plurality of signal lines further comprise a plurality of second signal lines arranged along a second direction, the switch structure comprises a switch transistor, a gate electrode of the switch transistor is electrically connected to a corresponding second signal line, the first direction intersects with the second direction, and the plurality of first signal lines and the plurality of second signal lines are intersected to form the plurality of regions.

4. The display device according to claim 3, wherein at least one second signal line of the plurality of second signal lines comprises a bent signal line.

5. The display device according to claim 3, wherein at least one first electrode of the plurality of first electrodes comprises a plurality of sub-electrodes electrically connected to each other, an included angle between an extension direction of at least one sub-electrode and an extension direction of at least one first signal line is not greater than 15 degrees, and the plurality of sub-electrodes are arranged along the first direction.

6. The display device according to claim 5, wherein the display panel further comprises a plurality of data lines arranged along the first direction and a plurality of gate lines arranged along the second direction, and an extension direction of the data line is same as an extension direction of the sub-electrode.

7. The display device according to claim 3, wherein the second electrode structure comprises a connection electrode provided crosswise and a plurality of second electrodes connected to the connection electrode, and an included angle between an extension direction of at least one second electrode and an extension direction of at least one first signal line is not greater than 10 degrees; and
in at least one region, the first electrode comprises a plurality of sub-electrodes, an extension direction of each sub-electrode is same as an extension direction of each second electrode, and the plurality of sub-electrodes and the plurality of second electrodes are arranged alternately along the first direction.

8. The display device according to claim 7, wherein the connection electrode comprises a plurality of first connection electrodes extending along an extension direction of the plurality of first signal lines and a plurality of second connection electrodes extending along an extension direction of the plurality of second signal lines, the plurality of first connection electrodes and the plurality of first signal lines are provided alternately, and the plurality of second connection electrodes and the plurality of second signal lines are provided alternately.

9. The display device according to claim 3, wherein the display panel further comprises a plurality of data lines arranged along the first direction and a plurality of gate lines arranged along the second direction, an extension direction of the data line is different from an extension direction of at least partial position of the first signal line, and an extension direction of the gate line is different from an extension direction of at least partial position of the second signal line.

10. The display device according to claim 3, wherein the display panel further comprises a plurality of data lines arranged along the first direction and a plurality of gate lines arranged along the second direction, and an orthographic projection of at least one data line on the first substrate overlaps with an orthographic projection of the first signal line on the first substrate.

11. The display device according to claim 3, wherein each sub-pixel comprises a thin film transistor, and a channel width-to-length ratio of the thin film transistor is not greater than a channel width-to-length ratio of the switch transistor.

12. The display device according to claim 3, wherein the light adjusting portion further comprises a black matrix, and an orthographic projection of the black matrix on the first substrate covers at least part of orthographic projections of the plurality of first signal lines and the plurality of second signal lines on the first substrate.

13. The display device according to claim 1, wherein the first electrode structure and the second electrode structure are provided in a same layer; or the first electrode structure is between the second electrode structure and the first substrate.

14. The display device according to claim 1, wherein portions of the plurality of signal lines are electrically connected to the plurality of first electrodes in one-to-one correspondence;
the first electrode structure and the second electrode structure are in different layers, and at least one of the plurality of signal lines is electrically connected to the second electrode structure.

15. The display device according to claim 14, wherein the first electrode comprises a plurality of sub-electrodes arranged along a first direction, the second electrode structure comprises a plurality of second electrodes arranged along the first direction, and the plurality of sub-electrodes and the plurality of second electrodes are provided alternately along the first direction;
the first electrode further comprises a first sub-connection portion electrically connected to the plurality of sub-electrodes, and the second electrode structure further comprises a second sub-connection portion electrically connected to the plurality of second electrodes.

16. The display device according to claim 14, wherein a shape of at least one signal line at a partial position overlapping with the first electrode in a direction perpendicular to the first substrate is straight or bent.

17. The display device according to claim 1, further comprising:
a first polarization structure, on a side of the display panel away from the light adjusting portion;
a second polarization structure, between the display panel and the light adjusting portion; and
a third polarization structure, on a side of the light adjusting portion away from the display panel,
wherein a polarization direction of the first polarization structure intersects with a polarization direction of the second polarization structure, and a polarization direction of the third polarization structure is same as the polarization direction of the second polarization structure.

18. The display device according to claim 1, further comprising:
an anti-peeping film, on a light incident side of the light adjusting portion.

19. The display device according to claim 1, further comprising:
a backlight structure, stacked with the light adjusting portion and the display panel,
wherein the light adjusting portion is between the backlight structure and the display panel, or the display panel is between the light adjusting portion and the backlight structure.

* * * * *